United States Patent
Kashiwagi et al.

(10) Patent No.: US 8,322,618 B2
(45) Date of Patent: Dec. 4, 2012

(54) IMAGE PROCESSING APPARATUS AND IMAGE PROCESSING METHOD

(75) Inventors: Masaki Kashiwagi, Hiratsuka (JP); Akinori Takeo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1483 days.

(21) Appl. No.: 11/779,634

(22) Filed: Jul. 18, 2007

(65) Prior Publication Data

US 2008/0019593 A1    Jan. 24, 2008

(30) Foreign Application Priority Data

Jul. 20, 2006  (JP) ................................. 2006-198213
Dec. 4, 2006   (JP) ................................. 2006-327629

(51) Int. Cl.
G06K 7/10       (2006.01)
(52) U.S. Cl. .................... 235/462.01; 235/487; 235/491; 235/492
(58) Field of Classification Search .................. 235/487, 235/462.01, 491, 492
See application file for complete search history.

(56) References Cited

U.S. PATENT DOCUMENTS

| | | | |
|---|---|---|---|
| 6,634,559 B2 * | 10/2003 | Shioda et al. | 235/487 |
| 2001/0054648 A1 | 12/2001 | Shioda et al. | 235/494 |
| 2003/0169435 A1 | 9/2003 | Kobayashi et al. | 358/1.2 |

FOREIGN PATENT DOCUMENTS

| | | |
|---|---|---|
| JP | 10-171912 | 6/1998 |
| JP | 2001-344588 | 12/2001 |
| JP | 2002-142063 | 5/2002 |
| JP | 2003-244424 | 8/2003 |
| JP | 2003-260822 | 9/2003 |
| JP | 2004-056387 | 2/2004 |
| JP | 2004-206447 | 7/2004 |
| JP | 2004-363705 | 12/2004 |
| JP | 2005-322225 | 11/2005 |
| JP | 2007-174317 | 7/2007 |

* cited by examiner

*Primary Examiner* — Kristy A Haupt
(74) *Attorney, Agent, or Firm* — Fitzpatrick, Cella, Harper & Scinto

(57) ABSTRACT

When a read resolution set for a reader unit (200) is different from the transmission resolution, the read resolution is increased, and then the reader unit (200) reads an image. When the image read by the reader unit (200) contains the first encoded image obtained by encoding input information, the first encoded image is decoded to restore the input information. The restored input information is encoded at the transmission resolution to generate the second encoded image. The second encoded image is transmitted to the destination.

28 Claims, 21 Drawing Sheets

F I G. 17
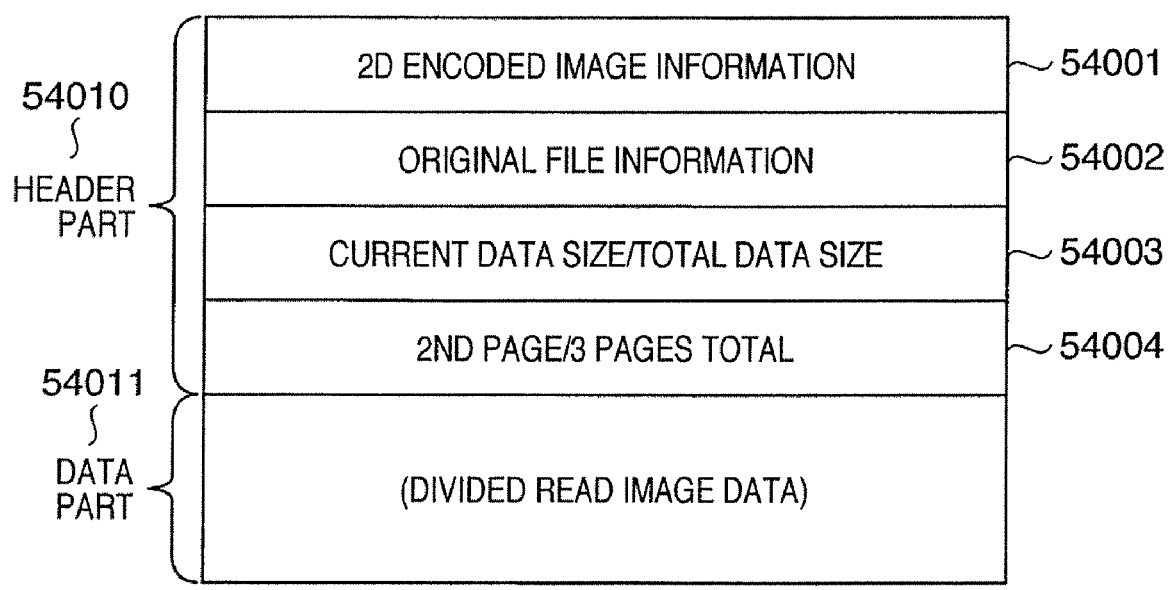

IMAGE PROCESSING APPARATUS AND IMAGE PROCESSING METHOD

BACKGROUND OF THE INVENTION

1. Field of the Invention

The present invention relates to an image transmission technology.

2. Description of the Related Art

Information on a product or the like is encoded and printed on paper, as typified by a barcode and the like. The information printed on paper is acquired by reading it by a reader, and used to product management and the like.

Not only information on a product but also information such as an image is encoded and printed on paper. An image input/output apparatus scans paper bearing the encoded image to decode the encoded image and restore the original data. The user can obtain a printed material by printing the restored original data.

There has been proposed a technique of printing encoded data on paper and restoring it by a multi-functional peripheral. For example, according to a technique disclosed in Japanese Patent Laid-Open No. 2001-344588 (U.S. Pat. No. 6,634,559), an original file is encoded and printed on paper together with its thumbnail. The original file can be printed by scanning the paper by a copying machine.

When scanning and transmitting a document image, the resolution of the scanned document image needs to be converted in accordance with a transmission resolution designated by the user or a resolution that may be processed by a destination device (e.g., FAX). In this case, if an encoded image prepared by encoding information exists in a document image, the resolution of the encoded image is also converted together with the document image, and information of the encoded image may be lost. Such an encoded image cannot be decoded at the destination of the document image.

If the resolution of an image containing an encoded image is converted, no encoded image can be decoded at the destination.

SUMMARY OF THE INVENTION

The present invention has been made to overcome the conventional drawbacks, and has as its object to provide a technique capable of, when outputting an image containing an encoded image, restoring original information of the encoded image at the output image destination.

It is another object of the present invention to guarantee reliable transmission of an image recognizable at the destination and target encoded data, and reduce such labor as retransmission.

Further features of the present invention will become apparent from the following description of exemplary embodiments with reference to the attached drawings.

BRIEF DESCRIPTION OF THE DRAWINGS

FIG. 17 is a view showing the structure of input data when performing 2D re-encoding;

DESCRIPTION OF THE EMBODIMENTS

Preferred embodiments of the present invention will be described in detail below with reference to the accompanying drawings.

First Embodiment

Figure 1:
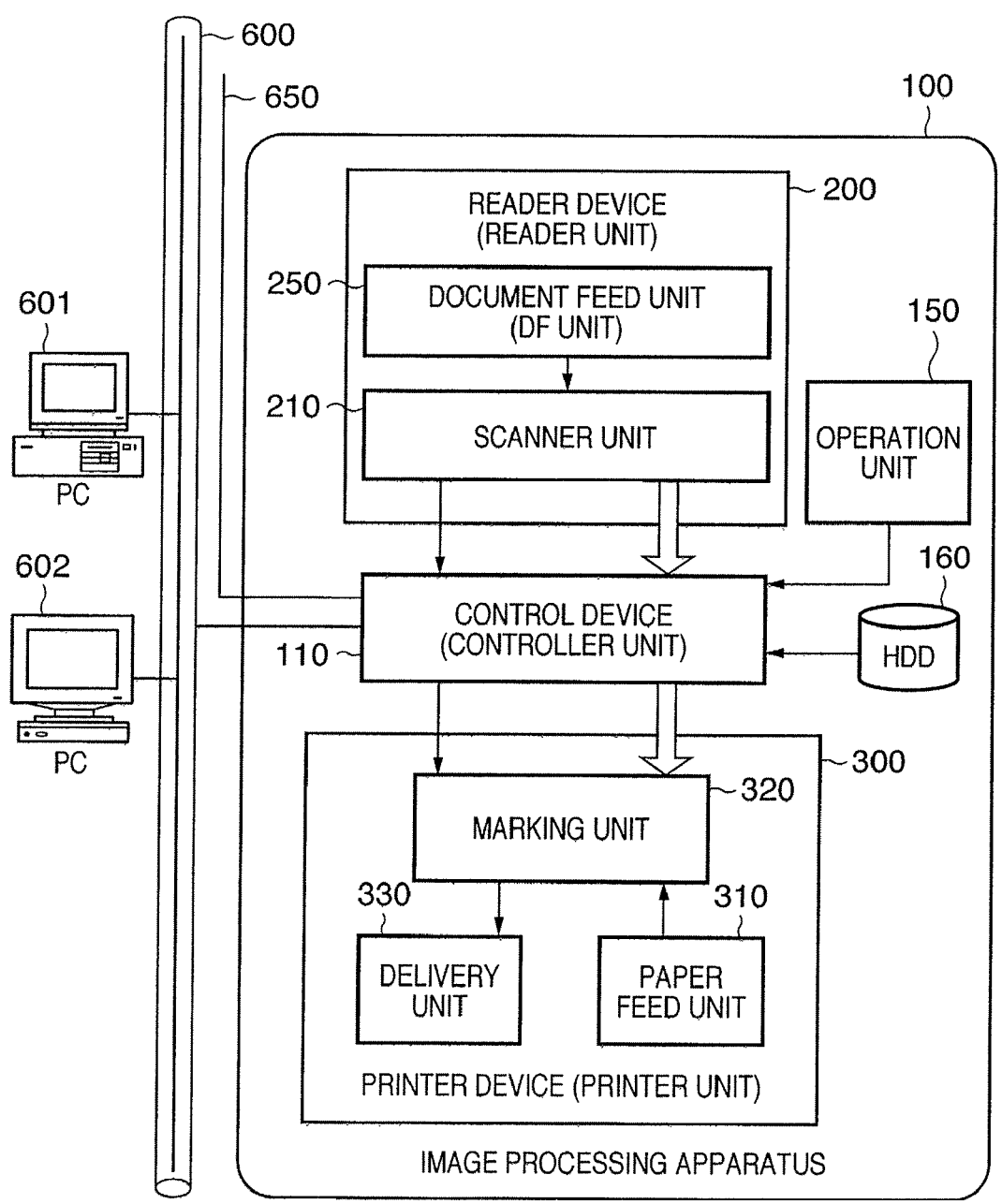
FIG. 1 is a view showing a configuration of a system including an image processing apparatus according to a first embodiment of the present invention.

FIG. 1 is a view showing a configuration of a system including an image processing apparatus according to the first embodiment. As shown in FIG. 1, the system according to the first embodiment comprises PCs (Personal Computers) 601 and 602 and an image processing apparatus 100, which are connected to a network 600 such as a LAN. These devices can communicate data with each other via the network 600. The image processing apparatus 100 is also connected to a public communication line 650.

The PCs 601 and 602 are general-purpose computers, and can properly transmit data to the image processing apparatus 100 via the network 600.

The image processing apparatus 100 is a multi-functional peripheral having a scan function and a print function. As shown in FIG. 1, the image processing apparatus 100 roughly comprises a reader device (reader unit) 200 which implements the scan function, and a printer device (printer unit) 300 which implements the print function. The image processing apparatus 100 also comprises a control device (controller unit) 110 which controls the overall image processing apparatus 100, and an operation unit 150 which is operated by the user to input various instructions to the image processing apparatus 100. The image processing apparatus 100 further comprises a HDD (Hard Disk Drive) 160 as a storage device which saves various types of information. As the arrangement of the image processing apparatus 100, FIG. 1 illustrates units to be described below, and does not illustrate an arrangement not to be described below.

The system configuration applicable to the first embodiment is not limited to the configuration depicted in FIG. 1, and modifications will readily occur to those skilled in the art.

The units which form the image processing apparatus 100 will be explained in more detail.

The operation unit 150 is made up of a touch panel type liquid crystal display and buttons. The liquid crystal display displays various windows such as a GUI to input various instructions such as copying and printing.

The HDD 160 can save a document image read by the reader unit 200, and save various programs and data.

The reader unit 200 comprises a document feed unit 250 which feeds document paper, and a scanner unit 210 which optically scans information on document paper fed by the document feed unit 250 to obtain the information as a document image.

The printer unit 300 comprises a paper feed unit 310 having a plurality of paper feed cassettes storing printing sheets, and a marking unit 320 which transfers/fixes an image onto printing paper supplied from the paper feed unit 310. The printer unit 300 further comprises a delivery unit 330 which performs sorting and stapling for printing paper bearing an image printed by the marking unit 320, and discharges the processed printing paper.

The controller unit 110 controls the operations of the reader unit 200 and printer unit 300. For example, the controller unit 110 implements a so-called copy function by controlling the reader unit 200 to acquire a document image, and controlling the printer unit 300 to print the document image on printing paper and output the printing paper to the outside.

The controller unit 110 also implements the scanner function of converting a document image acquired by the reader unit 200 into code data, and transmitting the code data to the PC 601 or 602 via the network 600. Further, the controller unit 110 implements functions such as the printer function of converting code data received from the PC 601 or 602 via the network 600 into image data, and outputting the image data to the printer unit 300.

Figure 2:
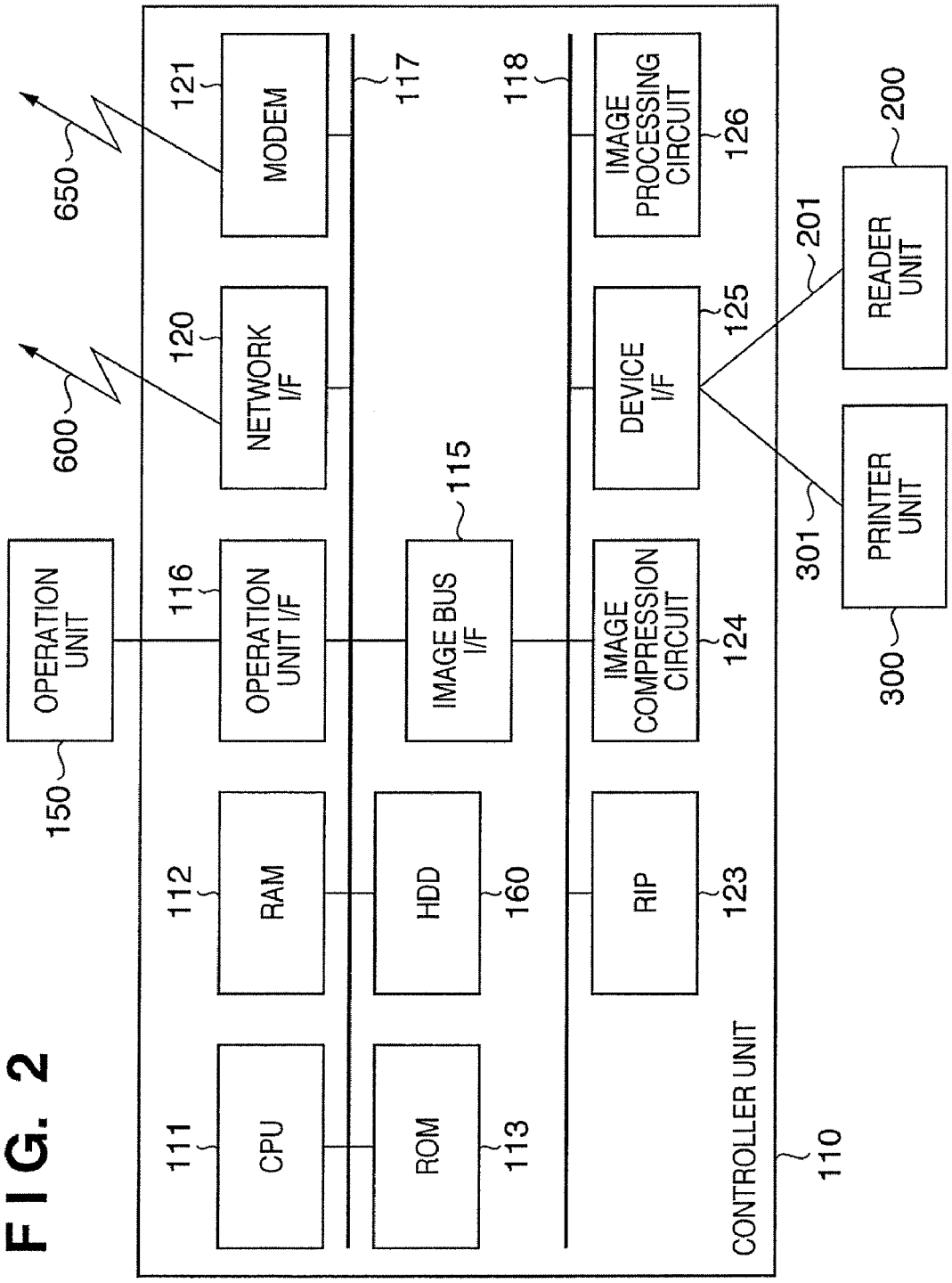
FIG. 2 is a block diagram showing the hardware configuration of an image processing apparatus 100.

FIG. 2 is a block diagram showing the hardware configuration of the image processing apparatus 100. FIG. 2 shows the arrangement of the controller unit 110 in more detail. In FIG. 2, the same reference numerals as those in FIG. 1 denote the same parts.

A CPU 111 uses programs and data stored in a RAM 112 and ROM 113 to execute various processes, which will be described to be performed by the controller unit 110.

The RAM 112 has an area for temporarily storing programs and data loaded from the HDD 160, data received via a network I/F 120, and document image data input from the reader unit 200. The RAM 112 also has a work area used when the CPU 111, an image compression circuit 124, and an image processing circuit 126 execute various processes. The RAM 112 can provide various areas, as needed.

The ROM 113 stores programs and data which cause the CPU 111 to execute processes (to be described later), which are performed by the image processing apparatus 100. The ROM 113 also stores setting data of the image processing apparatus 100, programs and data associated with a GUI displayed on the display screen of the operation unit 150, and the like. That is, the ROM 113 stores programs and data concerning the overall image processing apparatus 100. These programs and data are loaded into the RAM 112 under the control of the CPU 111, as needed, and processed by the CPU 111.

An operation unit I/F 116 functions as an interface for connecting the operation unit 150 to the controller unit 110.

The network I/F 120 functions as an I/F for connecting the image processing apparatus 100 to the network 600.

A modem 121 functions as an interface for connecting the image processing apparatus 100 to the public communication line 650.

A system bus 117 connects the above-described units.

An image bus I/F 115 is a bus bridge which connects the system bus 117 to an image bus 118 to be described below. When data is supplied via the image bus 118, the image bus I/F 115 converts the data structure.

The image bus 118 is formed from a PCI bus or IEEE1394, and transfers image data at high speed. Units to be described below are connected to the image bus 118.

A raster image processor (RIP) 123 rasterizes a PDL code into a bitmap image.

The image compression circuit 124 compresses/decompresses multilevel image data in accordance with JPEG, and binary image data in accordance with JBIG, MMR, or MH.

A device I/F 125 functions as an I/F for connecting the image processing apparatus 100 to the printer unit 300 and reader unit 200.

The image processing circuit 126 corrects, processes, and edits input image data.

Note that the image compression circuit 124 and image processing circuit 126 may be stored in the ROM 113 in the form of programs or data. In this case, the programs or data are loaded into the RAM 112 and executed by the CPU 111 to implement the functions of the image compression circuit 124 and image processing circuit 126.

Figure 3:
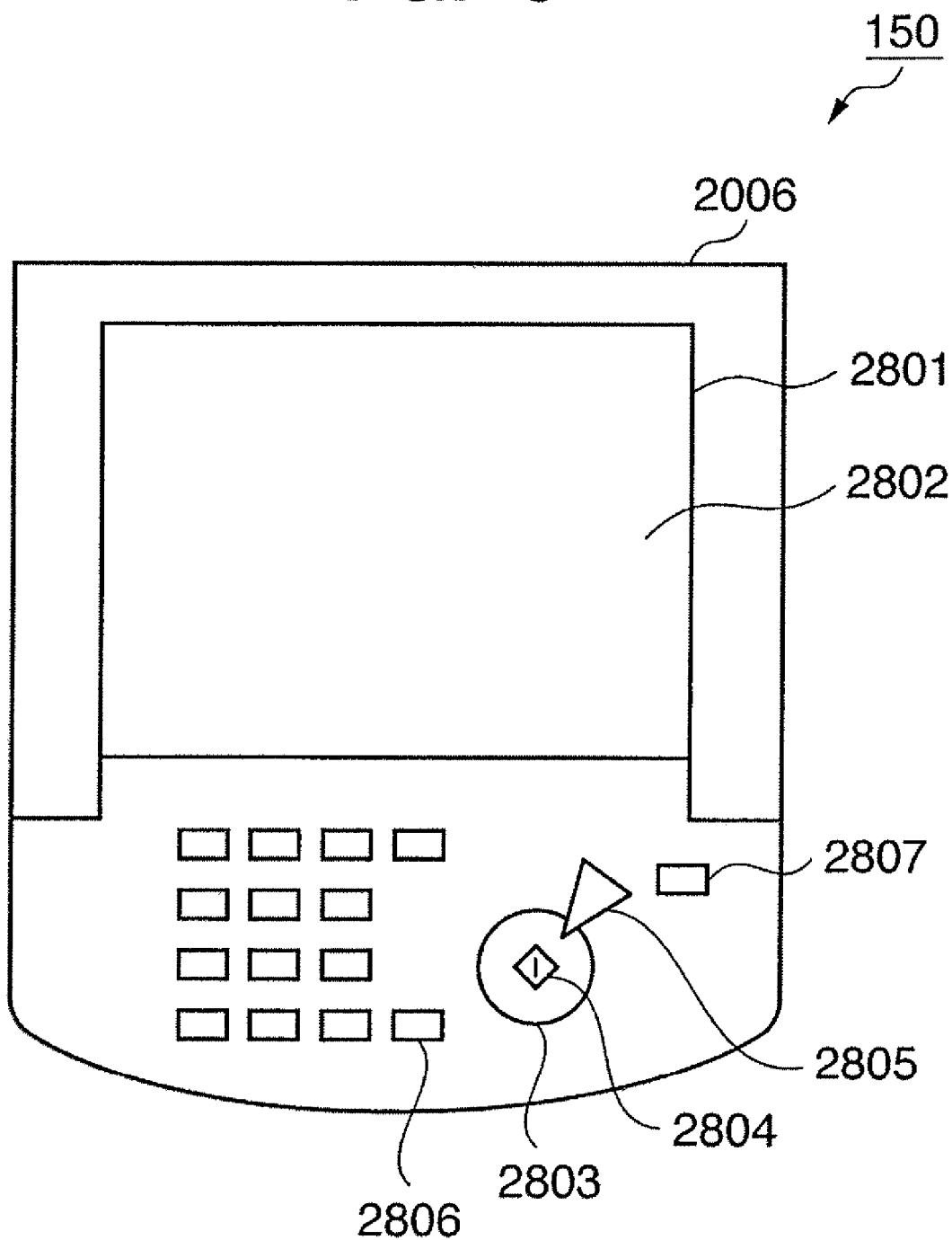
FIG. 3 is a view showing an arrangement of an operation unit 150.

FIG. 3 is a view showing an arrangement of the operation unit 150.

A touch panel sheet 2802 is adhered onto the LCD of an LCD display 2801. The LCD displays various operation windows and soft keys. When the user touches a displayed soft key, the touch panel sheet 2802 notifies the CPU 111 of information on the touched position.

The user presses a start key 2804 to instruct the reader unit 200 to read a document image. An LED in two, green and red colors is arranged at the center of the start key 2804, and the LED color represents whether the start key 2804 is available.

The user presses a stop key 2805 to stop an operation in progress. The user uses an ID key 2806 to input the ID (user ID) of the user of the apparatus. The user presses a reset key 2807 to initialize various settings input from the operation unit 150. These buttons may be hard keys, or soft keys displayed on the LCD.

Figure 4:
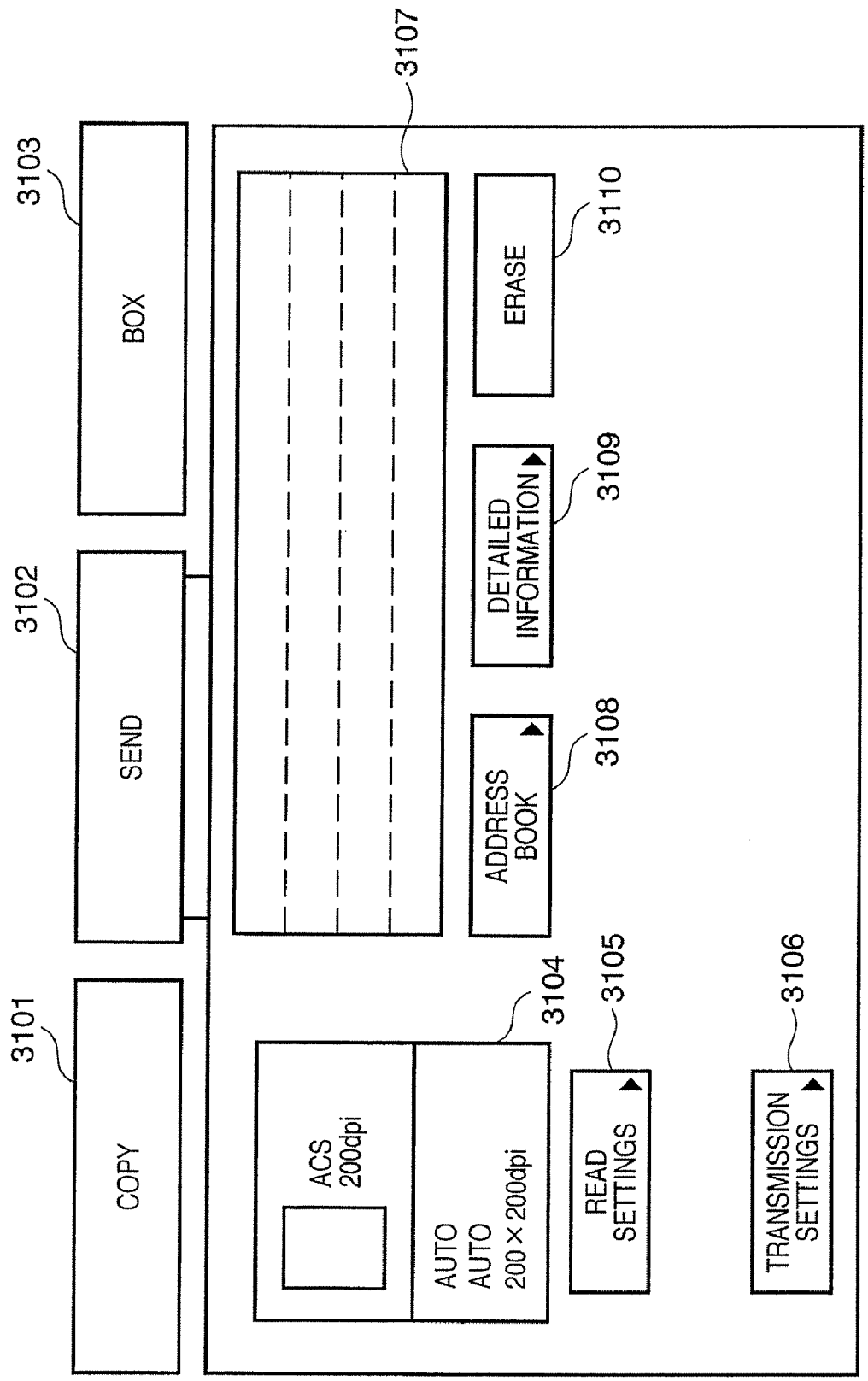
FIG. 4 is a view showing a display of an initial window on an LCD display 2801.

FIG. 4 is a view showing a display of an initial window on the LCD display 2801. In FIG. 4, a button image 3101 is used to input an instruction to switch the initial window to a window for making copy settings.

A button image 3102 is used to switch the initial window to a send window. That is, the button image 3102 is used to switch the initial window to a window for making settings when sending an image obtained by scanning a document or a target image held in the HDD 160 or RAM 112 to the outside via the public communication line 650 or network 600. When the user presses this button 3102, the initial window switches to the window for making settings when sending a document image to the outside by FAX or e-mail.

A button image 3103 is used to switch the initial window to a window for executing an operation related to a box (folder) to manage images for each user. The HDD 160 saves images managed by each box. On the box operation window, the user performs an operation to, e.g., store an input image such as a scanned image or PDL image in the HDD 160, print or send an image stored in the HDD 160, or edit an image stored in the HDD 160.

FIG. 4 shows a state in which the send window appears with the button image 3102. A button image 3105 is used to input an instruction to switch the initial window to a window for setting the scan resolution, density, and the like when the reader unit 200 scans an image. Setting contents are displayed in a field 3104.

A button image 3106 is used to input an instruction to switch the initial window to a window for making image send settings including a destination setting and timer send setting. As the destination setting, the user inputs, e.g., the telephone number or address of a destination, or designates a transmission format. As the transmission format, the user can select send by FAX, send by e-mail, send by SMB (Server Message Block), and the like.

When the user presses an address book button 3108, an address list registered in advance appears to allow him to select a desired address from the list and designate a destination. An address display list 3107 represents a destination input from a window switched by the button image 3106, and a destination selected from the address list displayed by the address book button 3108. When the user selects an address displayed in the address display list 3107 and designates a detailed information button 3109, detailed information of the selected address appears. When the user selects an address from the address display list 3107 and designates an erase button 3110, the selected address is erased from the address list.

Figure 5:
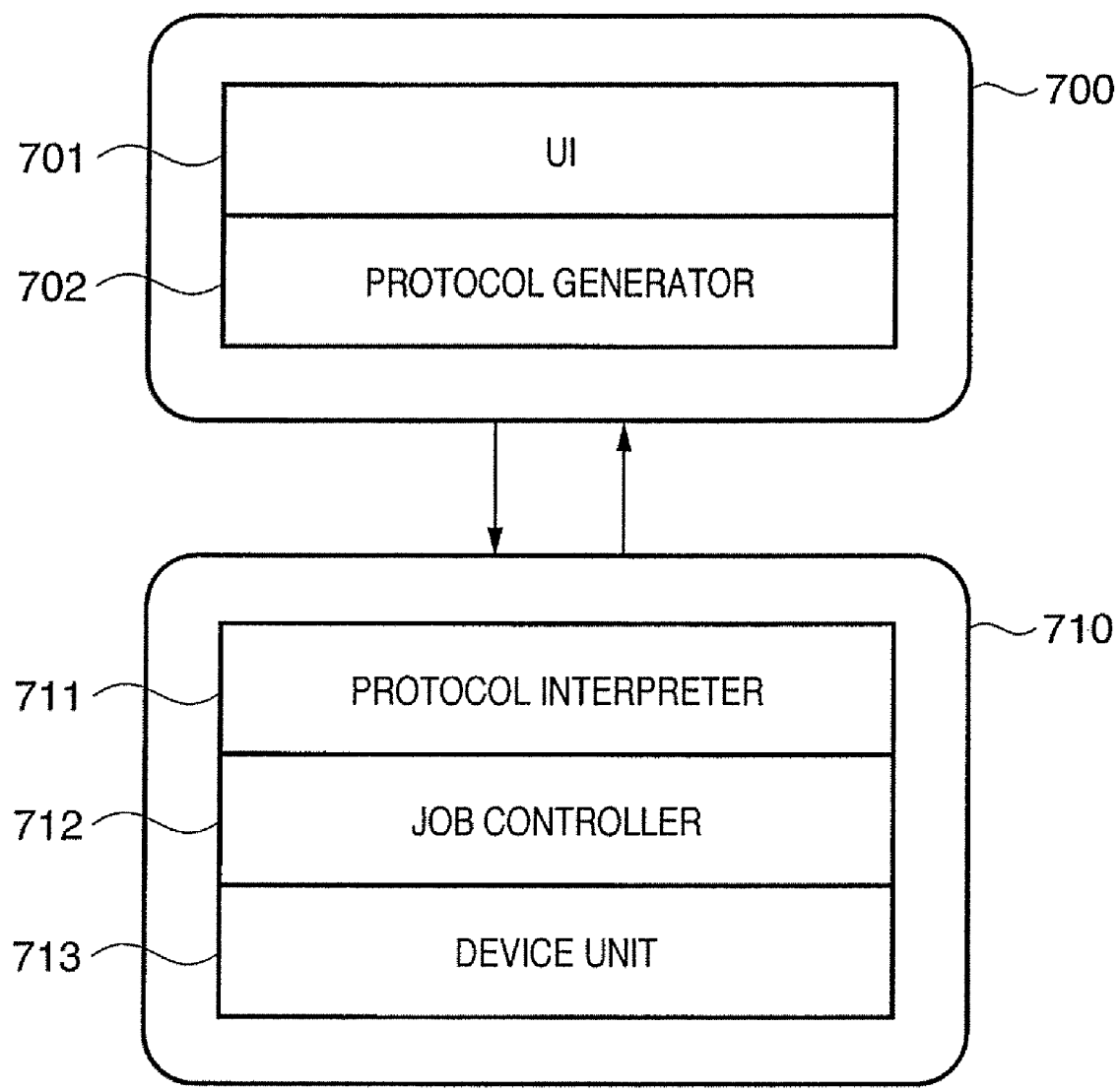
FIG. 5 is a block diagram showing a configuration of software stored in a ROM 113.

FIG. 5 is a block diagram showing a configuration of software stored in the ROM 113. In FIG. 5, application software 700 is made up of a UI (User interface) 701 for making various settings, and a protocol generator 702.

The application software 700 generates a job executable by the CPU 111, generates a command (protocol) to controller software 710, and communicates with the controller software 710. In the first embodiment, the application software 700 is software in the ROM 113. However, the application software 700 is not limited to this and may be, e.g., software in the PC 601 or 602.

The controller software 710 is made up of a protocol interpreter 711, job controller 712, and device unit 713.

The protocol interpreter 711 interprets a command (protocol) sent from the application software 700, and requests the job controller 712 to execute a job. The job controller 712 manages a variety of jobs requested by the protocol interpreter 711, and executes them in given (or determined) priority order. The device unit 713 includes the driver software programs of devices such as the printer unit 300 and reader unit 200, and is used when the job controller 712 executes a job.

Figure 6:
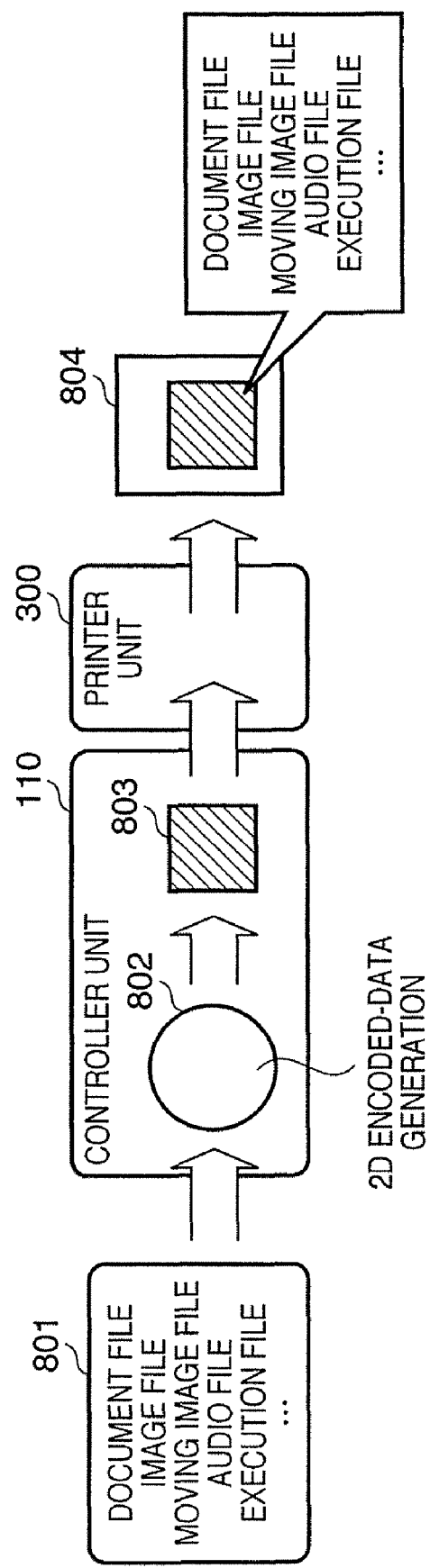
FIG. 6 is a view showing a series of processes for obtaining 2D encoded data (encoded image) by encoding input data (input information), and printing the 2D encoded data on a printing medium such as paper.

FIG. 6 is a view showing a series of processes to obtain 2D encoded data (encoded image) by encoding input data (input information), and print the 2D encoded data on a printing medium such as paper.

As shown in FIG. 6, input data 801 includes at least one of files such as a document file, image (still image) file, moving image file, audio file, and execution file. The input data 801 may be acquired from the PC 601 or 602 via the network 600, or from an external device via the public communication line 650. A still image file may be acquired as a document image by scanning with the reader unit 200. When the input data 801 is stored in the HDD 160 in advance, it may also be utilized. The input data 801 can be acquired in various ways.

In any case, when the controller unit 110 acquires the input data 801, it encodes the input data 801 to generate an encoded image 803 (2D encoded-data generation 802). The encoded image is obtained by encoding the input data 801, so any process may also be done for the input data 801 as long as the encoded image can be generated. However, the process for the input data 801 is premised on that the original input data 801 can be restored upon decoding an encoded image prepared by this process.

The generated encoded image is sent to the printer unit 300. The printer unit 300 prints the encoded image on a printing medium such as paper under the control of the controller software 710, outputting a printed material 804. The encoded image printed on the printed material 804 contains the input data 801, i.e., data such as a document file, image file, moving image file, audio file, or execution file.

The encoded image may also be printed on the entire surface of the printed material 804, or part of the printed material 804. The encoded image may also be printed together with another information (e.g., text information such as a file name or explanation representing the contents of the encoded image, or information not directly related to the encoded image).

Figure 7:
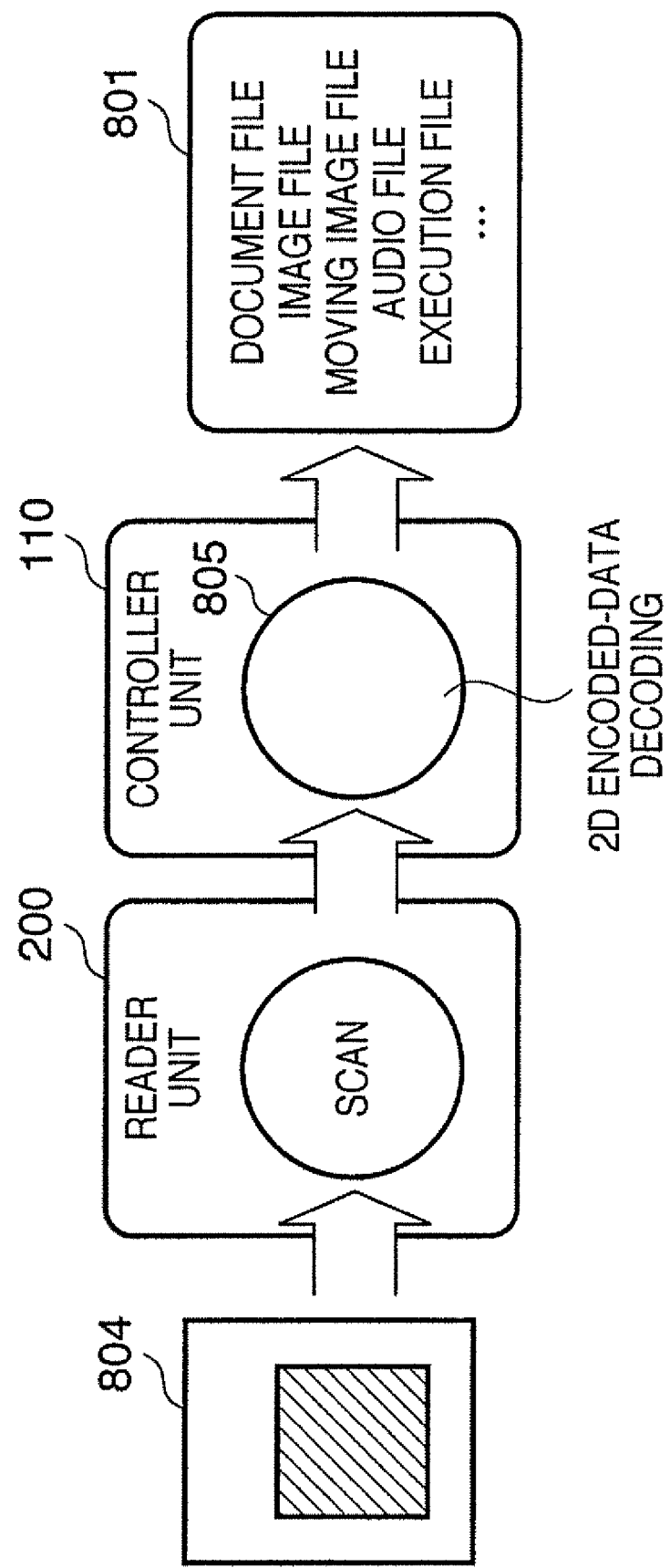
FIG. 7 is a view showing a series of processes for reading a printed material 804 by a reader unit 200, and restoring input data 801 from the read image.

FIG. 7 is a view showing a series of processes to read the printed material 804 by the reader unit 200 and restore the input data 801 from the read image. The reader unit 200 reads information printed on the printed material 804 as a document image under the control of the controller software 710, and sends the read document image to the controller unit 110. Upon detecting an encoded image from the document image, the controller unit 110 decodes it (2D encoded-data decoding 805) to restore the input data 801.

Figure 8:
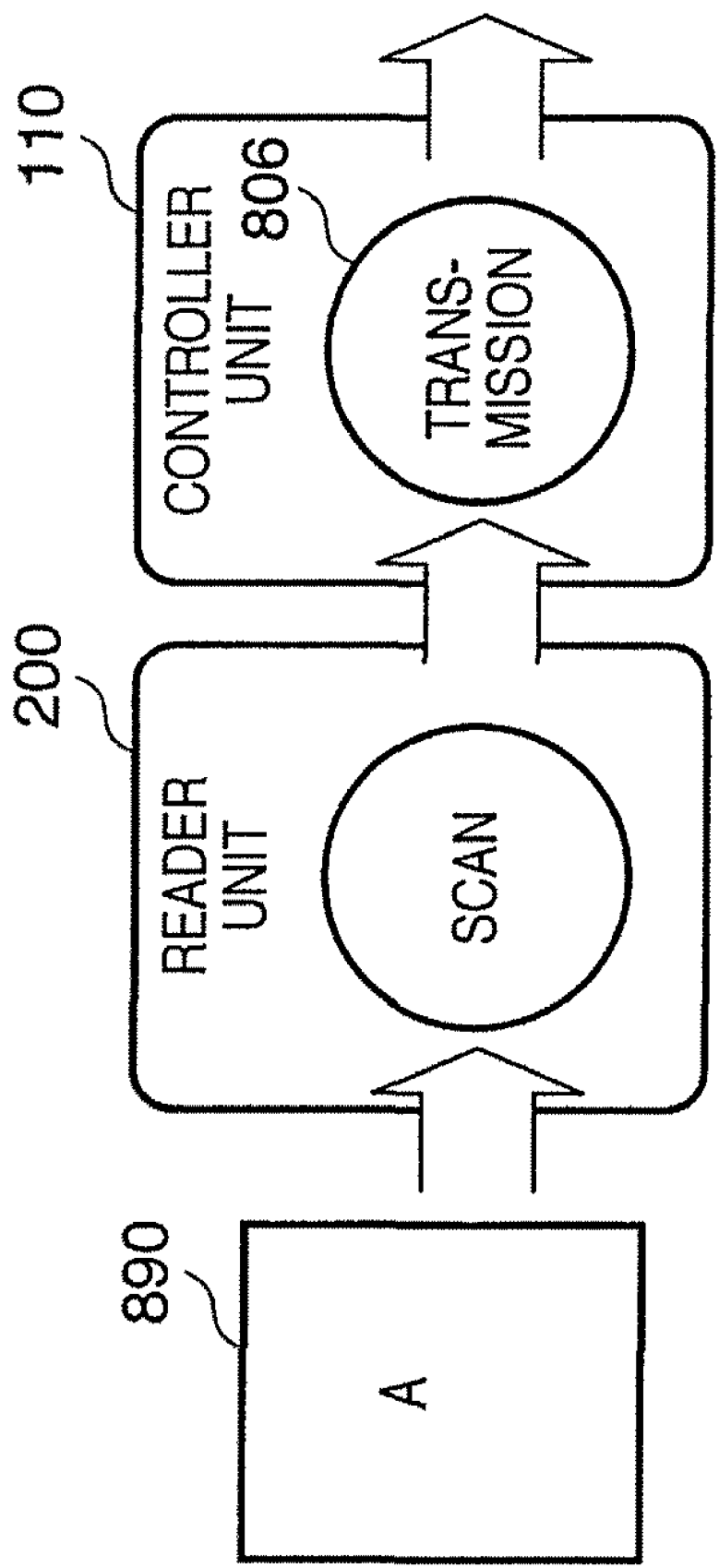
FIG. 8 is a view showing a series of processes for reading a printed material 890 as a document image by the reader unit 200, and transmitting the read document image to the outside.

FIG. 8 is a view showing a series of processes to read a printed material 890 as a document image by the reader unit 200 and transmit the read document image to the outside.

The controller software 710 controls the reader unit 200 in accordance with contents set via the operation unit 150. Under this control, the reader unit 200 reads information printed on the printed material 890 as a document image, and sends the read document image to the controller unit 110. The controller unit 110 transmits the document image to the outside via the network 600 or public communication line 650 (transmission 806).

Figure 9:
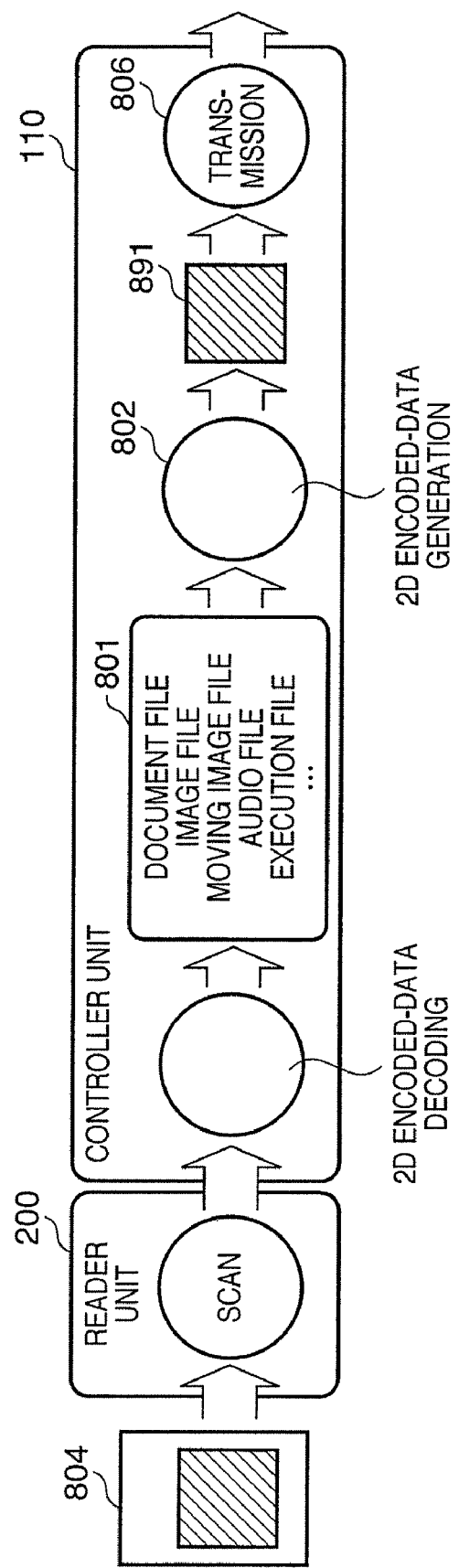
FIG. 9 is a view showing a series of processes for reading the printed material 804 containing an encoded image as a document image by the reader unit 200, and transmitting the encoded image to the outside.

FIG. 9 is a view showing a series of processes to read the printed material 804 containing an encoded image as a document image by the reader unit 200 and transmit the encoded image to the outside.

The controller software 710 controls the reader unit 200 in accordance with contents, set via the operation unit 150. Under this control, the reader unit 200 reads information printed on the printed material 804 as a document image, and sends the read document image to the controller unit 110.

When an encoded image exists in the document image and the transmission resolution of the document image is low, the information amount of the encoded image may decrease. As a result, no input data can be restored from the encoded image.

To prevent this, when an encoded image exists in the document image, the controller unit 110 extracts and decodes it to restore the input data 801. Then, the controller unit 110 encodes the restored input data 801 again (2D encoded-data generation 802) to obtain an encoded image 891 suited to a resolution corresponding to the transmission format or destination device, or a resolution (transmission resolution) designated by the user. The transmission resolution may be a resolution designated by the user via the operation unit 150, or determined in accordance with the line capability of a network for transmitting the encoded image, or the capability of a destination device. For example, when the line capability of the network or the capability of the destination device is poor, the transmission resolution is set lowest to generate the encoded image 891 so that the destination device can restore it.

The generated encoded image 891 (or a document image generated by replacing an encoded image contained in the read document image with the encoded image 891) is transmitted to the outside via the network 600 or public communication line 650. The transmission format of the encoded image 891 is properly converted depending on the transmission format or the type of network used for transmission.

When transmitting the encoded image 891 to the outside, it may be divided. Alternatively, the input data 801 serving as the original data of the encoded image 891 may be divided to encode and transmit each divided data. In any case, when dividing and transmitting data, header information must also be transmitted to represent the correspondence between each divided data and part of the input data 801. The receiving device can restore the input data 801 from respective divided data. The technique of restoring original data from divided data is well known, and a detailed description thereof will not be repeated.

Figure 10:
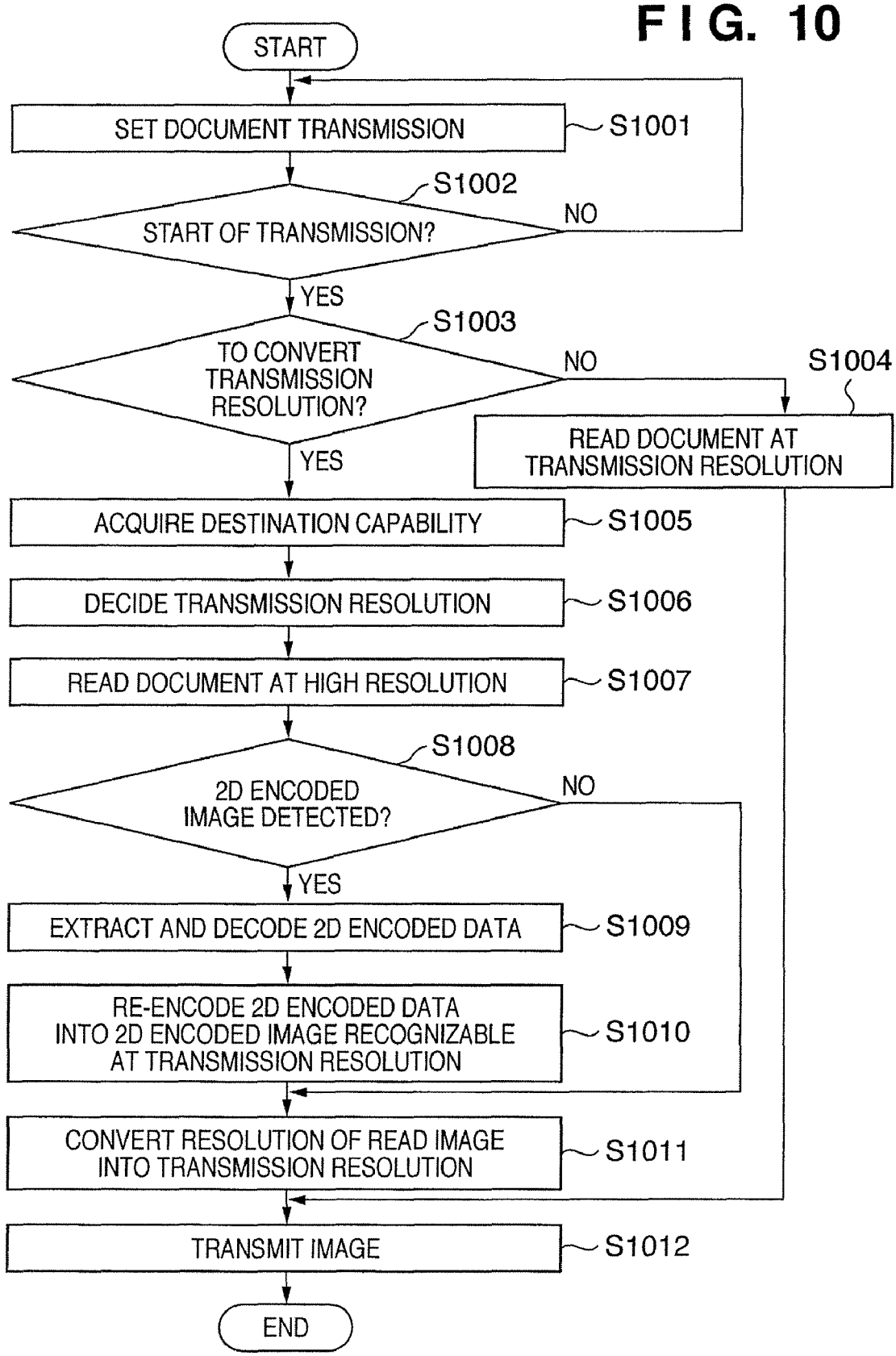
FIG. 10 is a flowchart of a process for reading information printed on a document as a document image by the image processing apparatus 100, and transmitting the read document image to the outside.

FIG. 10 is a flowchart of a process to read information printed on a document as a document image by the image processing apparatus 100 and transmit the read document image to the outside. The ROM 113 stores programs and data which cause the CPU 111 to execute the process according to the flowchart of FIG. 10. The programs and data are loaded into the RAM 112 under the control of the CPU 111, as needed. The CPU 111 executes processes using the loaded programs and data, and the image processing apparatus 100 executes processes to be described below.

The user inputs setting information about transmission of a document image via the operation unit 150. In step S1001, the image processing apparatus 100 acquires the input setting information. The setting information includes the destination, transmission format (e.g., FAX or e-mail), and the type of line used for transmission. When the user designates a transmission resolution, the setting information includes the designated transmission resolution.

It is also possible to determine a transmission resolution in advance in accordance with the transmission format (e.g., FAX or e-mail) or the type of destination device, store the correspondence in the ROM 113. In this case, if the type of destination device can be specified on the basis of setting information set by the user, the transmission resolution can be decided. If neither the type nor capability of the destination device can be specified on the basis of the setting information, the capability of the destination device may be acquired in step S1005 (to be described later).

The read resolution of a document image is so set as to read the target document image at a resolution (e.g., 600 dpi) high enough to decode an encoded image contained in the document image.

If the user inputs a transmission start instruction via the operation unit 150, the CPU 111 detects in step S1002 that he has input the transmission start instruction, and the process advances to step S1003. If the CPU 111 does not detect any transmission start instruction in step S1002, the process returns to step S1001 to make transmission settings.

In step S1003, the image processing apparatus 100 refers to the setting information acquired in step S1001 to determine whether the resolution of the document image read at the read resolution may be converted. When, for example, the capability of the destination device is poor, the destination device may not be able to process an image at the read resolution. In this case, a document image must be transmitted after decreasing its resolution. The image processing apparatus 100 makes this determination in step S1003.

In the first embodiment, when the transmission resolution can be decided on the basis of the setting information, it is compared with the read resolution. The transmission resolution can be decided on the basis of the setting information in, for example, a case where the user directly designates a transmission resolution or the transmission resolution can be specified on the basis of a destination device designated by the user and the correspondence stored in the ROM 113.

If the read resolution is equal to the transmission resolution, the image processing apparatus 100 determines that no resolution need be converted, and the process advances to step S1004. If the read resolution is different from the transmission resolution, the process advances to step S1005. Also when no transmission resolution can be decided on the basis of the setting information (e.g., the capability of the destination device is unknown), the process advances to step S1005.

In step S1004, the image processing apparatus 100 controls the reader unit 200 to read the document at the transmission resolution (read resolution), obtaining a document image at the transmission resolution. In step S1012, the image processing apparatus 100 transmits the document image to a destination designated by the setting information. The format of the document image is also converted in accordance with the transmission format, and the document image is transmitted by a protocol corresponding to the transmission format.

In step S1005, the image processing apparatus 100 acquires the capability of the destination device and the capability of the network line used for transmission. The process in step S1005 may be performed only when no transmission resolution can be decided on the basis of the setting information.

In step S1006, the image processing apparatus 100 decides a transmission resolution on the basis of the information acquired in step S1005 or the setting information. When, for example, the capability of the destination device is poor, the transmission resolution is set to 300 dpi. When the user designates a transmission resolution in the setting information, the transmission resolution decided by the setting information is adopted.

In step S1007, the image processing apparatus 100 controls the reader unit 200 to read the document at the set read resolution (resolution enough to decode an encoded image: e.g., 600 dpi or the highest resolution settable in the reader unit).

In step S1008, the image processing apparatus 100 checks whether an encoded image exists in the document image acquired in step S1007. Whether a desired image exists in an image is checked using a well-known technique. For example, markers are printed at four corners of an encoded image when printing an encoded image on a document. If the four markers can be detected, the image processing apparatus 100 determines in step S1008 that an encoded image exists. Various techniques are applicable to the process in step S1008, so the process is not particularly limited.

If the image processing apparatus 100 determines as a result of the check in step S1008 that no encoded image exists in the document image, the process advances to step S1011 to convert the resolution of the document image read in step S1007 into the transmission resolution. In step S1012, the image processing apparatus 100 transmits the document image at the transmission resolution to a destination designated by the setting information. The format of the document image is also converted in accordance with the transmission format, and the document image is transmitted by a protocol corresponding to the transmission format.

If the image processing apparatus 100 determines as a result of the check in step S1008 that an encoded image exists in the document image, the process advances to step S1009. In step S1009, the image processing apparatus 100 extracts and decodes the encoded image, restoring the input data. In step S1010, the image processing apparatus 100 encodes the restored input data again into an encoded image at the transmission resolution (encoded image at a resolution at which it can be decoded at the destination). When the re-encoded image becomes large (input data extends over one encoded image), it may also be divided into a plurality of encoded images.

In step S1011, the image processing apparatus 100 converts the resolution of the document image read in step S1007 into the transmission resolution.

In step S1012, the image processing apparatus 100 transmits the encoded image at the transmission resolution and the document image at the transmission resolution to the destination designated by the setting information. The formats of the encoded image and document image are also converted in accordance with the transmission format, and the encoded image and document image are transmitted by a protocol corresponding to the transmission format.

As described above, according to the first embodiment, an document image containing an encoded image can be transmitted without losing information contained in the encoded image. The side receiving document image can decode the received encoded image to restore the original data.

According to the first embodiment, a document image is always transmitted after converted into an image decodable at the destination. The first embodiment can prevent transmission of an image which cannot be decoded at the destination, and can reduce the labor to retransmit an image.

According to the first embodiment, both a document image and encoded image are transmitted in step S1012, but may be selectively transmitted. For example, when it is determined that a read document image contains only an encoded image, only the re-encoded image may also be transmitted without transmitting the document image.

A document image and encoded image may be separately transmitted, or one image may be superposed or embedded in the other to transmit them together. When transmitting a document image and encoded image together, the original encoded image contained in the read document image is desirably replaced with an image re-encoded in step S1010. If the re-encoded image extends over the document image after replacing the original encoded image, it is also possible to divide the extending part, embed part of the encoded image in the next page, and transmit it.

Second Embodiment

The second embodiment will describe another process to read information printed on a document by an image processing apparatus 100 and transmit the read document image to the outside. More specifically, according to the second embodiment, the user uses an operation unit 150 to designate in advance whether an encoded image exists in a document read by a reader unit 200.

In the following description, an image processing apparatus and system in the second embodiment are the same as those in the first embodiment. The second embodiment is the same as the first embodiment, unless otherwise specified.

Figure 11:
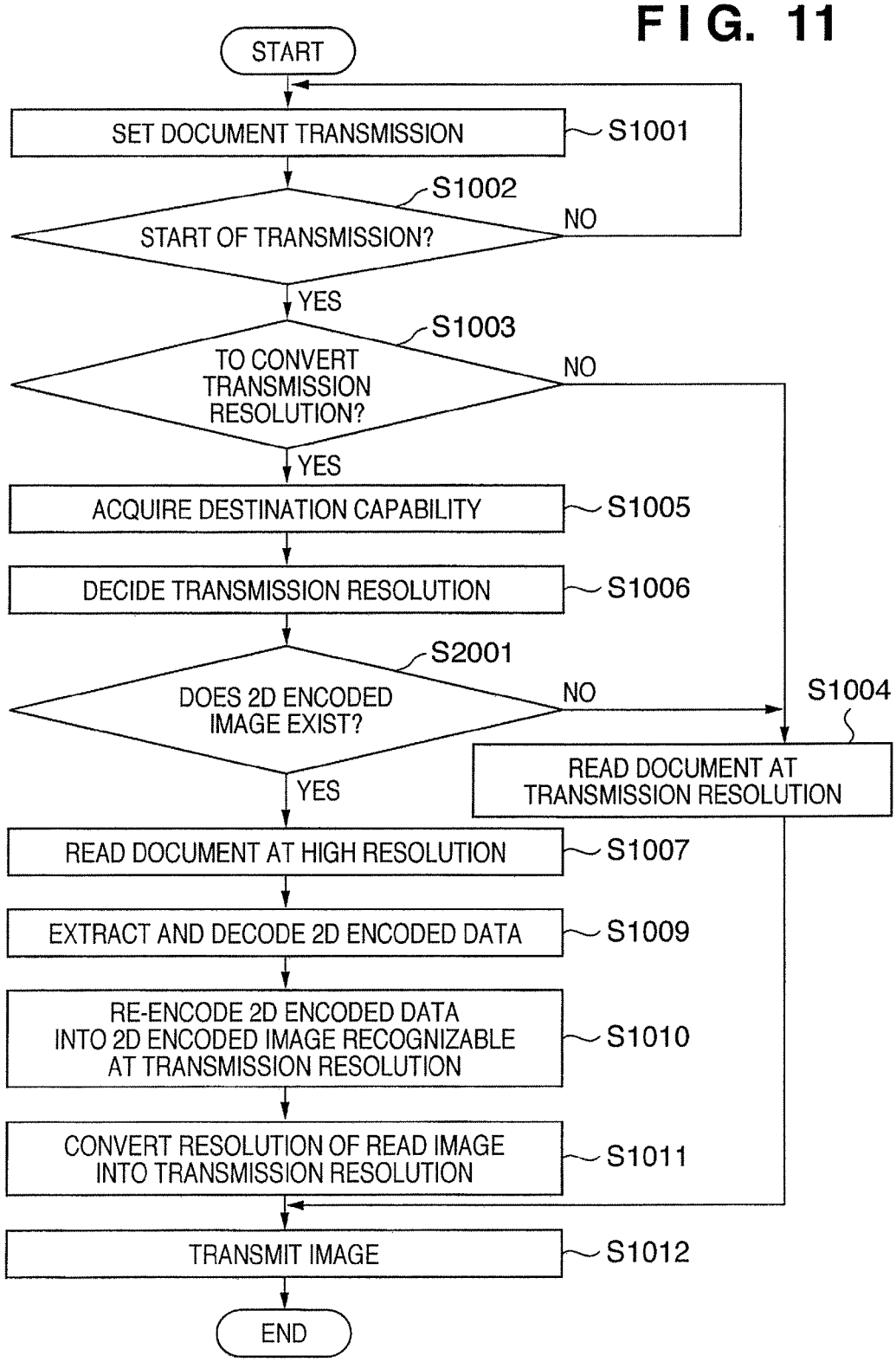
FIG. 11 is a flowchart of a process for reading information printed on a document as a document image by the image processing apparatus 100, and transmitting the read document image to the outside according to a second embodiment.

FIG. 11 is a flowchart of the process to read information printed on a document as a document image by the image processing apparatus 100 and transmit the read document image to the outside according to the second embodiment. A ROM 113 stores programs and data which cause a CPU 111 to execute the process according to the flowchart of FIG. 11. The programs and data are loaded into a RAM 112 under the control of the CPU 111, as needed. The CPU 111 executes processes using the loaded programs and data, and the image processing apparatus 100 executes processes to be described below.

In FIG. 11, the same step numbers as those in FIG. 10 denote the same steps.

In step S1001, the image processing apparatus 100 acquires setting information about transmission of a document image that is input via the operation unit 150. The setting information has been described in the first embodiment. In the second embodiment, when inputting the setting information via the operation unit 150, the user designates whether an encoded image exists in a document to be read by the reader unit 200. In step S1001 of FIG. 11, the image processing apparatus 100 acquires this designation.

If the user inputs a transmission instruction via the operation unit 150, the CPU 111 detects it in step S1002, and then the process advances to step S1003. If the CPU 111 does not detect any transmission instruction in step S1002, it returns to step S1001 to repeat the process.

In step S1003, similar to the first embodiment, the CPU 111 determines whether the resolution may be converted. In this case, the image processing apparatus 100 compares the currently set read resolution of the reader unit 200 with the transmission resolution to check whether these resolutions are equal.

If no resolution is converted, i.e., the currently set read resolution of the reader unit 200 is equal to the transmission resolution, the process advances to step S1004. In step S1004, the image processing apparatus 100 controls the reader unit 200 to read the document at the transmission resolution. In step S1012, the image processing apparatus 100 transmits the document image to a destination designated by the setting information. The format of the document image is also converted in accordance with the transmission format, and the document image is transmitted by a protocol corresponding to the transmission format.

If the image processing apparatus 100 determines that the resolution may be converted, i.e., the currently set read resolution of the reader unit 200 is different from the transmission resolution, the process advances to step S1005. In step S1005, the image processing apparatus 100 acquires the capability of the destination device and the capability of the network line used for transmission.

In step S1006, the image processing apparatus 100 decides the transmission resolution. When, for example, the capability of the destination device is poor, the transmission resolution is set to 300 dpi.

In step S2001, based on the designation (designation representing whether an encoded image exists in the document) acquired from the user in step S1001, the image processing apparatus 100 determines whether an encoded image exists in the document. If the image processing apparatus 100 determines that no encoded image exists in the document, the process advances to step S1004 to read the document at the transmission resolution decided in step S1006. If the image processing apparatus 100 determines that an encoded image exists in the document, the process advances to step S1007.

In step S1007, the image processing apparatus 100 controls the reader unit 200 to read the document at the read resolution (resolution enough to decode an encoded image: e.g., 600 dpi or the highest resolution settable in the reader unit).

In step S1009, the image processing apparatus 100 extracts the encoded image from the read document image and decodes it as described in the first embodiment, thereby restoring the input data. In step S1010, the image processing apparatus 100 re-encodes the restored input data into an encoded image decodable at the transmission resolution.

In step S1011, the image processing apparatus 100 converts the resolution of the document image read in step S1007 into the transmission resolution. In step S1012, the image processing apparatus 100 transmits the encoded image at the transmission resolution and the document image at the transmission resolution to the destination designated by the setting information. The formats of the encoded image and document image are also converted in accordance with the transmission format, and the encoded image and document image are transmitted by a protocol corresponding to the transmission format.

Third Embodiment

The third embodiment will describe a case where when transmitting a document image by mail, the user instructs an image processing apparatus to transmit restored input data as a file attached to mail without re-encoding the restored input data. In the following description, an image processing apparatus and system in the third embodiment are the same as those in the first embodiment. The third embodiment is the same as the first embodiment, unless otherwise specified.

Figure 12:
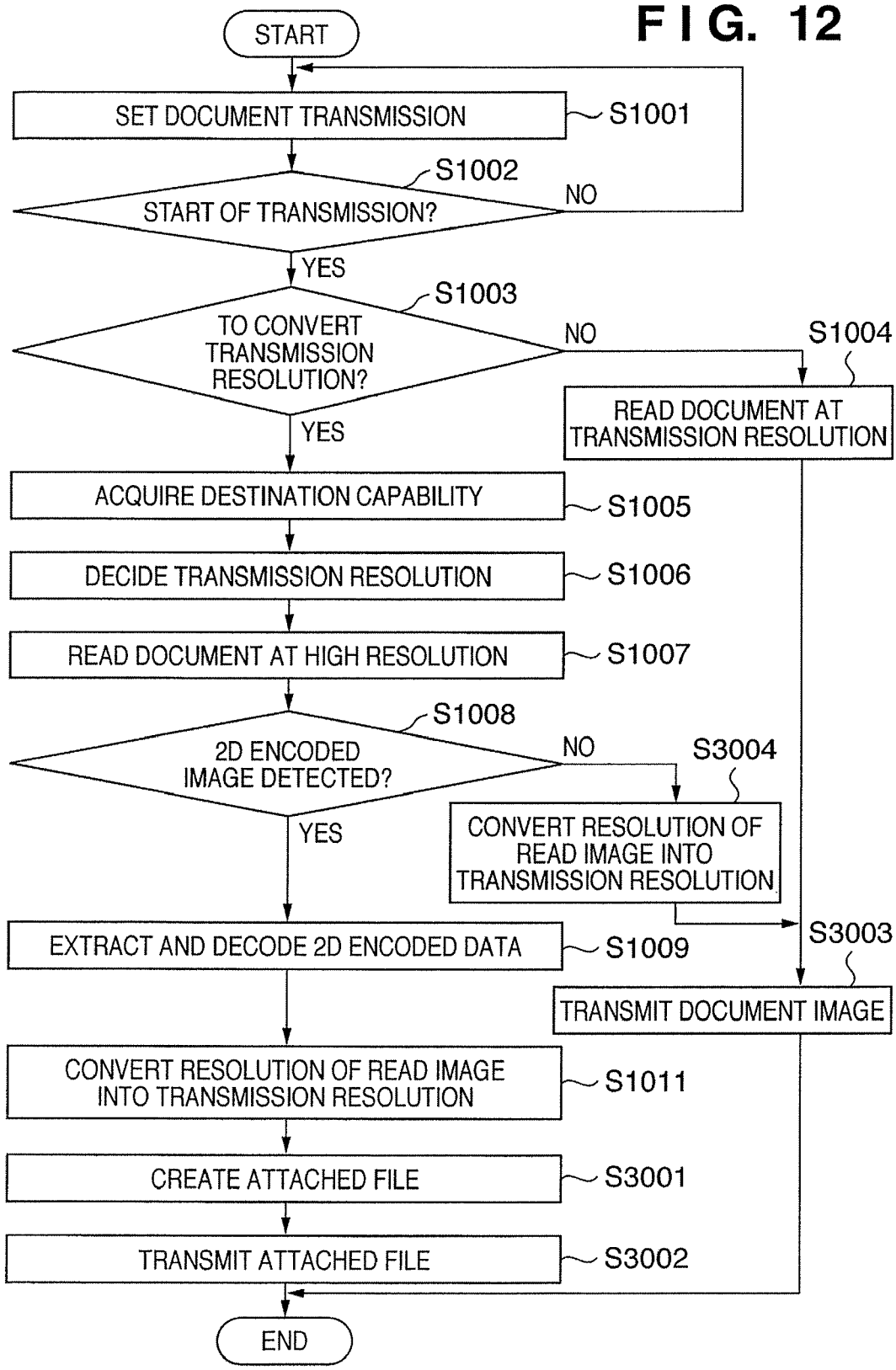
FIG. 12 is a flowchart of a process for reading information printed on a document as a document image by an image processing apparatus 100, and transmitting the read document image to the outside according to a third embodiment.

FIG. 12 is a flowchart of a process to read information printed on a document as a document image by an image processing apparatus 100 and transmit the read document image to the outside according to the third embodiment. A ROM 113 stores programs and data which cause a CPU 111 to execute the process according to the flowchart of FIG. 12. The programs and data are loaded into a RAM 112 under the control of the CPU 111, as needed. The CPU 111 executes processes using the loaded programs and data, and the image processing apparatus 100 executes processes to be described below.

In FIG. 12, the same step numbers as those in FIG. 10 denote the same steps.

If the user inputs setting information about transmission of a document image via an operation unit 150, the image processing apparatus 100 acquires the input setting information in step S1001. In the third embodiment, assume that the user sets mail sending.

If the user inputs a transmission instruction via the operation unit 150, the CPU 111 detects it in step S1002, and then the process advances to step S1003. If the CPU 111 does not detect any transmission instruction, it returns to step S1001 to repeat the process.

In step S1003, the image processing apparatus 100 determines whether the resolution may be converted. For example, the image processing apparatus 100 compares the currently set read resolution of a reader unit 200 with the transmission resolution to check whether these resolutions are equal. If the image processing apparatus 100 cannot decide the transmission resolution at this time, the process advances to step S1005.

If no resolution is converted, i.e., the currently set read resolution of the reader unit 200 is equal to the transmission resolution, the process advances to step S1004. In step S1004, the image processing apparatus 100 controls the reader unit 200 to read the document at the transmission resolution. In step S3003, the image processing apparatus 100 attaches the document image to mail, and transmits it to a destination designated by the setting information as the mail address. The format of the document image is also converted in accordance with the transmission format, and the document image is transmitted by a protocol corresponding to the transmission format.

If the resolution is converted, i.e., the currently set read resolution of the reader unit 200 is different from the transmission resolution, the process advances to step S1005. In step S1005, the image processing apparatus 100 acquires the capability of the destination device and the capability of the network line used for transmission.

In step S1006, the image processing apparatus 100 decides the transmission resolution on the basis of the information acquired in step S1005.

In step S1007, the image processing apparatus 100 controls the reader unit 200 to read the document at the read resolution (resolution enough to decode an encoded image: e.g., 600 dpi or the highest resolution settable in the reader unit).

In step S1008, the image processing apparatus 100 checks whether an encoded image exists in the document image acquired in step S1007. If the image processing apparatus 100 determines as a result of the check in step S1008 that no encoded image exists in the document image, the process advances to step S3004 to convert the resolution of the document image read in step S1007 into the transmission resolution. In step S3003, the image processing apparatus 100 attaches the document image to mail, and transmits it to the destination designated by the setting information as the mail address.

If the image processing apparatus 100 determines as a result of the check in step S1008 that an encoded image exists in the document image, the process advances to step S1009. In step S1009, the image processing apparatus 100 extracts and decodes the encoded image, restoring the input data.

In step S1011, the image processing apparatus 100 converts the resolution of the document image read in step S1007 into the transmission resolution. In step S3001, the image processing apparatus 100 creates the input data restored in step S1009 as an attached file. In step S3002, the image processing apparatus 100 attaches, to mail, the attached file (input data file) created in step S3001 and the document image converted into the transmission resolution in step S1011. Then, the image processing apparatus 100 transmits the mail to the destination designated by the setting information as the mail address.

As described above, according to the third embodiment, if the resolution needs to be converted when transmitting an document image containing an encoded image by mail, original input data of the encoded image is transmitted as an attached file. The receiving side need not perform any decoding process to obtain input data, unlike the first embodiment. Even a device having no decoding function or a device for which it is difficult to decode data can obtain input data.

The third embodiment may be combined with an arrangement in which whether an encoded image exists in a document image is determined on the basis of user designation, similar to the second embodiment. In this case, whether an encoded image exists is determined on the basis of user designation before the process in step S1007. If it is determined that no encoded image exists, an image is read at the transmission resolution, attached to mail, and transmitted. If it is determined that an encoded image exists, processes in step S1007 and subsequent steps are performed. In this case, a document image containing no encoded image can be transmitted at higher speed.

Fourth Embodiment

The fourth embodiment will describe a case where the resolution of an encoded image contained in a document can be changed in copying. More specifically, input data obtained by decoding an encoded image present in a document image is re-encoded at a resolution designated by the user, and the re-encoded image is printed.

Figure 13:
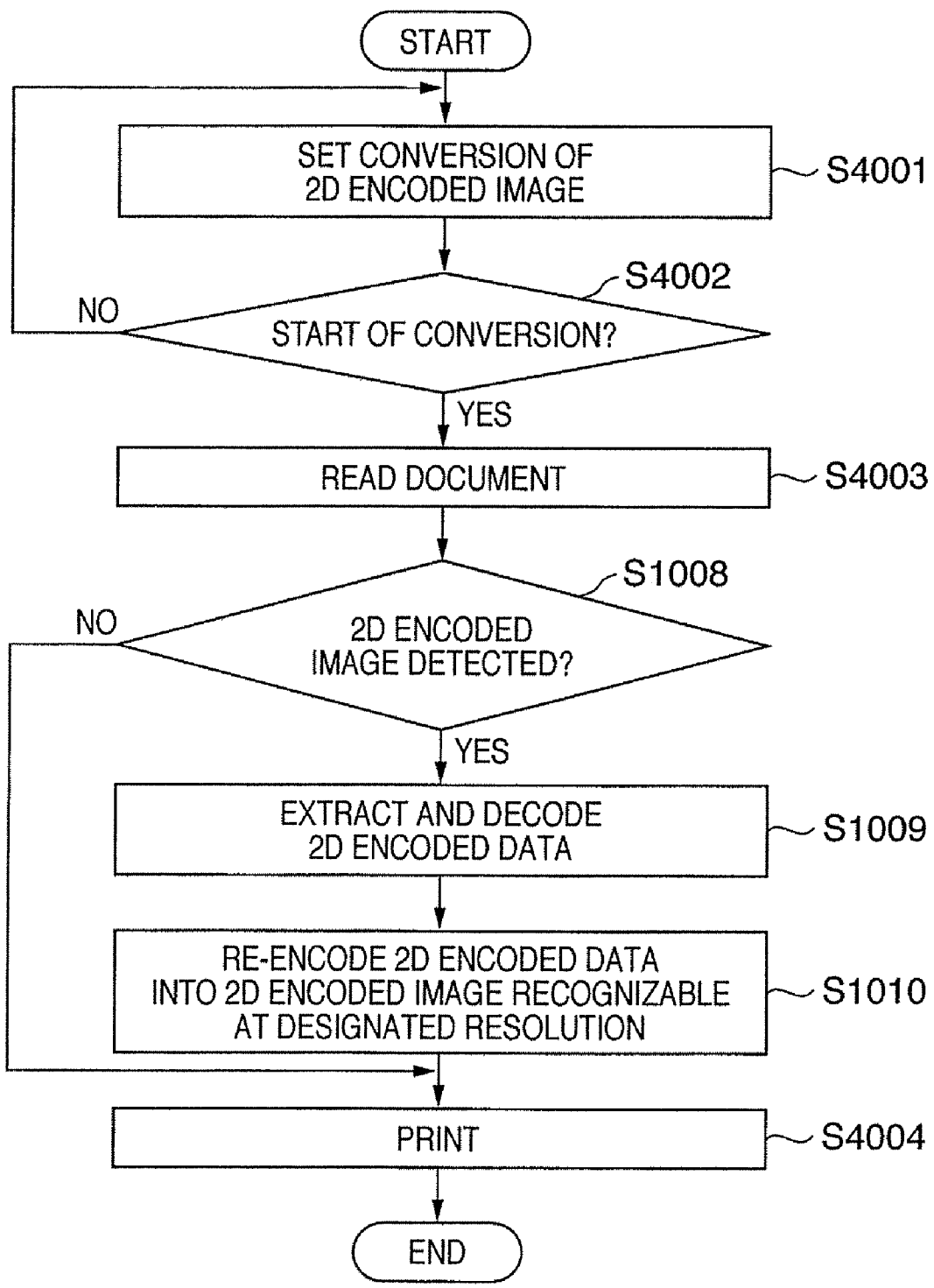
FIG. 13 is a flowchart of a process for reading information printed on a document as a document image by the image processing apparatus 100, and print out the read document image according to a fourth embodiment.

FIG. 13 is a flowchart of a process to read information printed on a document as a document image by an image processing apparatus 100 and print out the read document image according to the fourth embodiment. A ROM 113 stores programs and data which cause a CPU 111 to execute the process according to the flowchart of FIG. 13. The programs and data are loaded into a RAM 112 under the control of the CPU 111, as needed. The CPU 111 executes processes using the loaded programs and data, and the image processing apparatus 100 executes processes to be described below.

In FIG. 13, the same step numbers as those in FIG. 10 denote the same steps.

The user uses an operation unit 150 to input the resolution of an encoded image contained in a document image. In step S4001, the image processing apparatus 100 acquires the setting (encoding resolution). The encoding resolution is suitable for a device which scans later a printed material obtained by the print process in step S4004 (to be described later) and restore an encoded image contained in the scan result. The resolution may be directly designated by the user, or specified in accordance with designation by the user on the assumption of a scanning device.

In step S4002, the image processing apparatus 100 checks whether the user has input a print start instruction via the operation unit 150.

If the image processing apparatus 100 determines as a result of the check that the user has input the print start instruction, the process advances to step S4003. If the user has not input the print start instruction, the process returns to step S4001.

In step S4003, a reader unit 200 reads information printed on a document as a document image.

In step S1008, the image processing apparatus 100 checks whether an encoded image exists in the read document image. The image processing apparatus 100 may check it similarly to the first embodiment, or may check designation "whether an encoded image exists" by the user, as described in the second embodiment.

If the image processing apparatus 100 determines as a result of the check that no encoded image exists in the document image, the process advances to step S4004 to send the document image read in step S4003 to a printer unit 300. The printer unit 300 prints the received document image.

If the image processing apparatus 100 determines as a result of the check that an encoded image exists in the document image, the process advances to step S1009. In step S1009, the image processing apparatus 100 extracts the encoded image and decodes the extracted encoded image, restoring the input data. In step S1010, the image processing apparatus 100 encodes the restored input data again to an encoded image at the encoding resolution acquired in step S4001.

In step S4004, the image processing apparatus 100 sends the image encoded again in step S1010 to the printer unit 300. The printer unit 300 prints the received encoded image.

As described above, according to the fourth embodiment, an encoded image contained in an document image can be printed after encoding the encoded image again at a resolution designated by the user.

The fourth embodiment has exemplified "printing" as one output format, but may also be applied to another output format such as external transmission.

The above-described embodiments including the fourth embodiment may also be properly combined.

Fifth Embodiment

Figure 14:
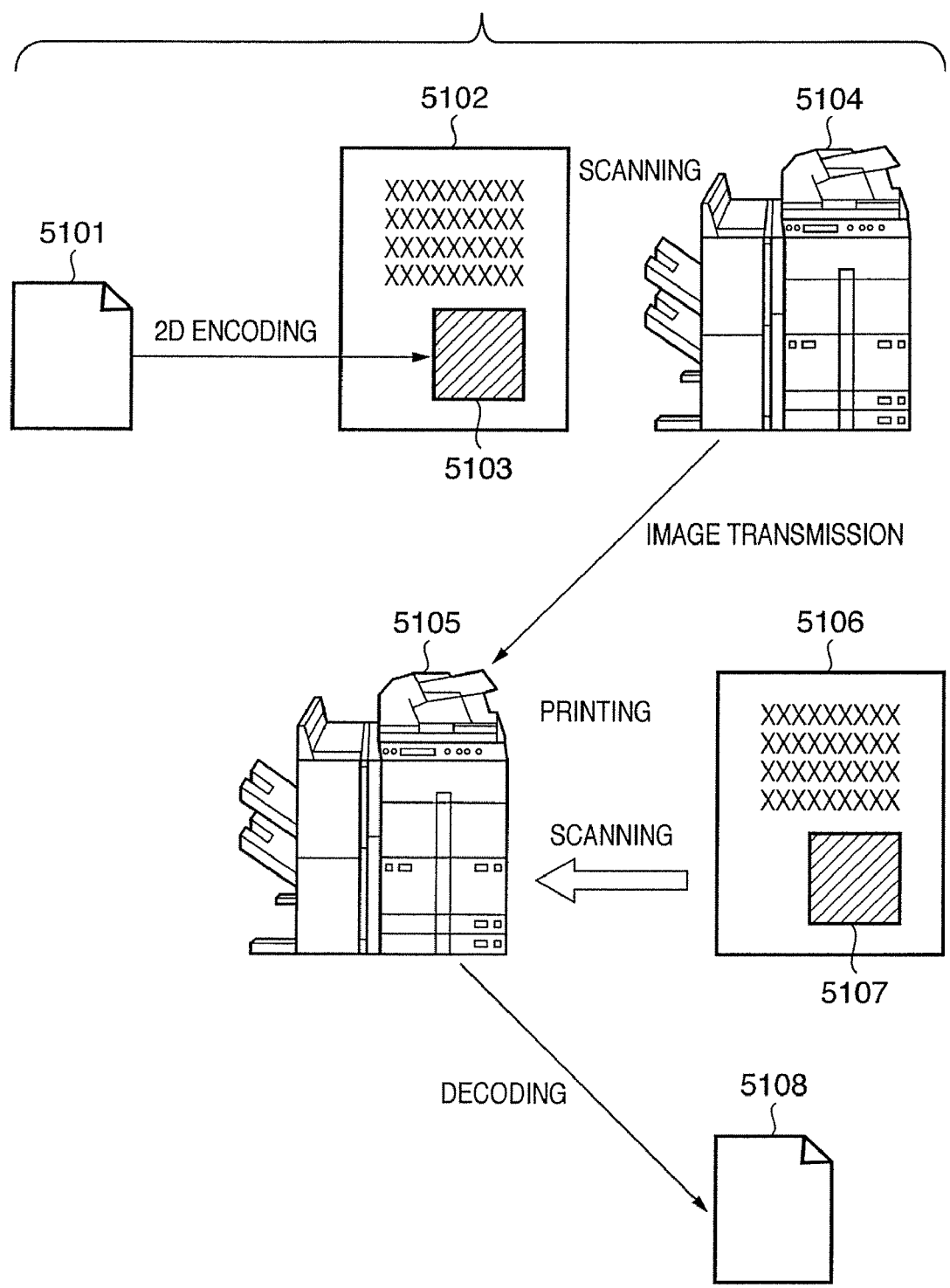
FIG. 14 is a conceptual view showing an overall system according to a fifth embodiment of the present invention.

FIG. 14 is a conceptual view showing an overall system according to the fifth embodiment.

In FIG. 14, a multi-functional peripheral (MFP) 5104 is an exemplary image input/output apparatus, and is connected to an external apparatus 5105 via a telephone line, network, or the like. The external apparatus 5105 is an exemplary external apparatus, and is a multi-functional peripheral (MFP) identical to the multi-functional peripheral 5104 in the fifth embodiment. The multi-functional peripheral 5104 and external apparatus 5105 can generate image data by reading a document, print or copy the image data, and transmit the image by FAX, e-mail, or another transmission format. The multi-functional peripheral 5104 and external apparatus 5105 can process and print externally received data, and transmit an image to the outside by FAX, e-mail, or another transmission format. In the fifth embodiment, the external apparatus 5105 is a multi-functional peripheral identical to the multi-functional peripheral 5104. However, the external apparatus 5105 can be an arbitrary external apparatus such as an information processing apparatus, FAX apparatus, or another apparatus as long as it is connected to the multi-functional peripheral 5104 via a network, telephone line, or the like, and can receive and process an image transmitted from the multi-functional peripheral 5104.

Input data 5101 to be two-dimensionally encoded may be any data manageable as document data, an image file, audio data, or another file. The input data 5101 is encoded two-dimensionally in accordance with a 2D encoding algorithm, and printed as a 2D encoded image on a document image 5102. The 2D encoded image according to the fifth embodiment is encoded depending on a specific resolution, and cannot be decoded unless it is scanned at a resolution equal to or higher than one in encoding. If the data size of the input data 5101 is constant, the 2D encoded image becomes smaller at a higher resolution and larger at a lower resolution. The 2D encoding algorithm in the fifth embodiment is not particularly defined, and is arbitrary as long as the algorithm has a resolution-dependent decoding condition.

The document image 5102 is scanned and processed by the MFP 5104. An image 5103 is printed on the document image.

The image 5103 is a 2D encoded image which is obtained by two-dimensionally encoding the input data 5101 and printed on the document image 5102. A printed material 5106 is an output obtained by receiving and printing data by the external apparatus 5105. A 2D encoded image 5107 is contained in the printed material 5106. Output data 5108 is output when scanning the printed material 5106 and decoding the 2D encoded image 5107.

In the fifth embodiment, the multi-functional peripheral 5104 scans the document image 5102 bearing the 2D encoded image 5103 obtained by two-dimensionally encoding the input data 5101, and transmits the scanned image to the external apparatus 5105. The external apparatus 5105 prints the received image, scans the printed material 5106, and decodes the embedded 2D encoded image 5107, obtaining the output data 5108 identical to the input data 5101. To obtain the output data 5108, printing and scanning need not always be executed. The external apparatus 5105 may directly decode received image data into a 2D encoded image. As long as both the transmitting apparatus 5104 and receiving apparatus 5105 can process a 2D encoded image at the same resolution, the 2D encoded image can be transmitted, printed, and scanned without changing the resolution. If the capability of the receiving apparatus is poor, it may not be able to decode a 2D encoded image unless the resolution is converted.

Figure 15:
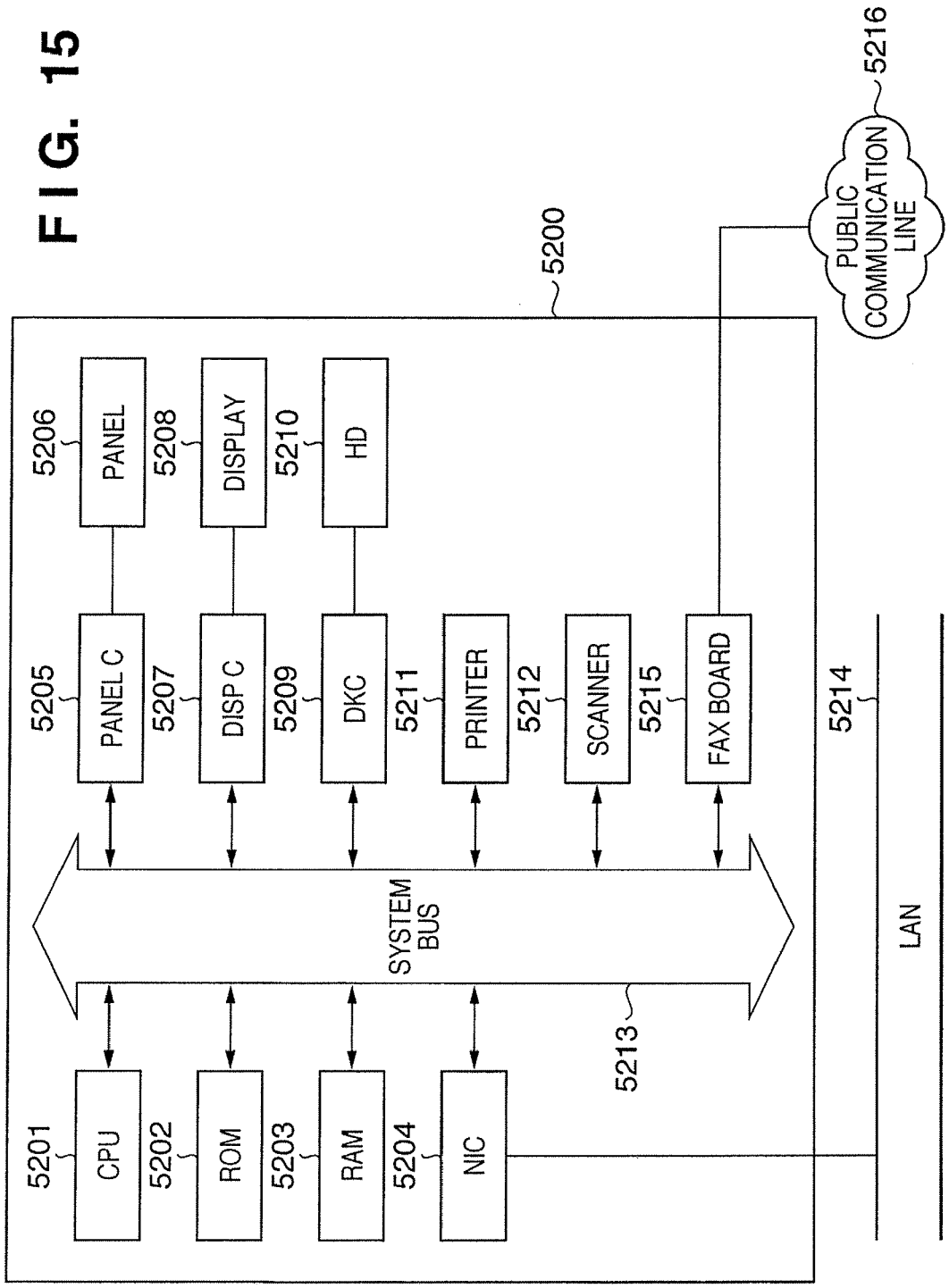
FIG. 15 is a hardware block diagram showing multi-functional peripherals (MFPs) 5104 and 5105.

FIG. 15 is a block diagram showing the internal arrangement of the multi-functional peripheral (MFP) 5104. In FIG. 15, a multi-functional peripheral 5200 corresponds to the multi-functional peripheral 5104. The multi-functional peripheral 5200 comprises a CPU 5201 which executes software stored in a ROM 5202 or a large-capacity storage (HD) 5210 such as a hard disk. The CPU 5201 controls all devices connected to a system bus 5213.

A RAM 5203 functions as a main memory, work area, and the like for the CPU 5201.

An external input controller (PANELC) 5205 controls instruction inputs from various buttons, a touch panel (PANEL) 5206, and the like of the multi-functional peripheral 5200.

A display controller (DISPC) 5207 controls display of a display module (DISPLAY) 5208 formed from a liquid crystal display or the like.

A network interface card (NIC) 5204 exchanges data with another network device, file server, or the like in two ways via a LAN 5214.

An electrophotographic or inkjet printing unit (PRINTER) 5211 prints on paper.

An image reading unit (SCANNER) 5212 reads an image printed on paper. In many cases, the image reading unit 5212 has an optional auto document feeder (not shown), and can automatically read a plurality of document sheets.

The large-capacity storage 5210 is sometimes used as a temporary storage location for an image.

A FAX board 5215 is connected to a public communication line 5216, and communicates with another device via the public communication line 5216 to FAX-transmit/receive data.

In the fifth embodiment, control and determination are done by executing a program stored in advance in the ROM 5202 or large-capacity storage 5210 by the CPU 5201. An input from the user is accepted via the PANEL 5206 and displayed to the user on the DISPLAY 5208.

Figure 16:
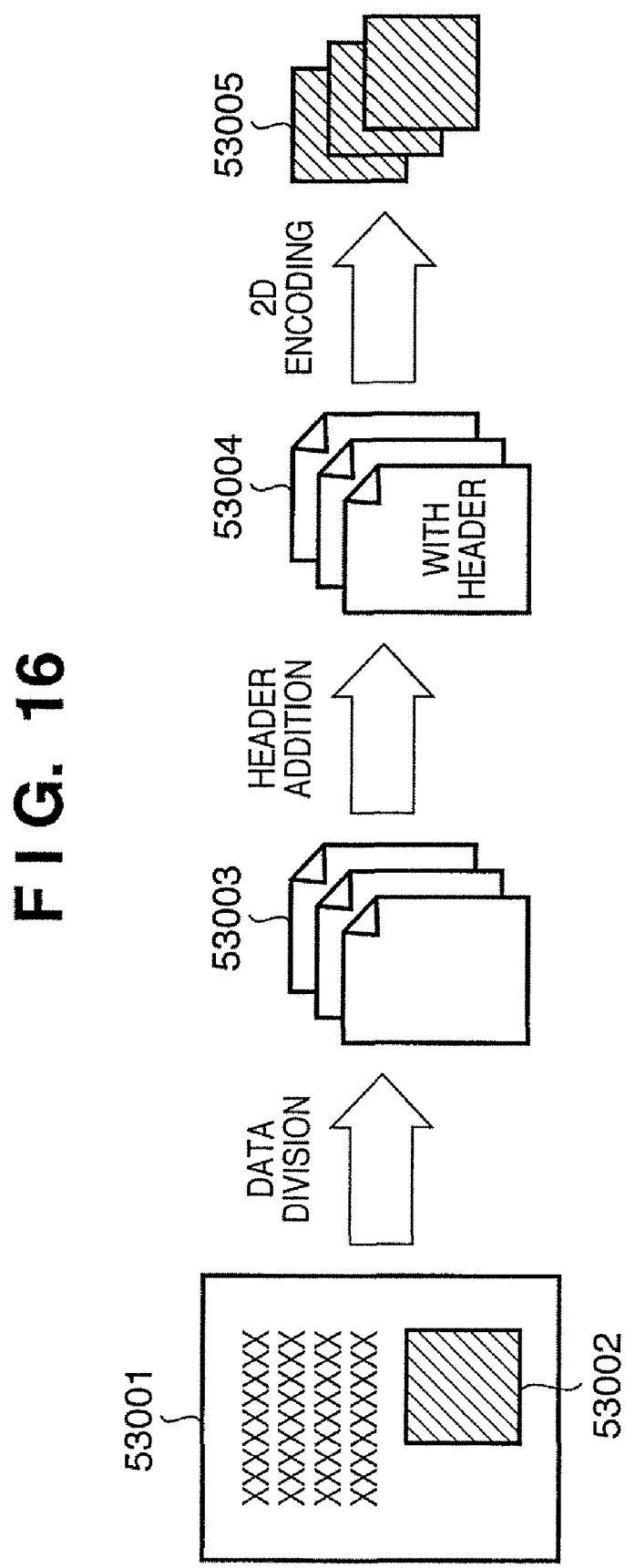
FIG. 16 is a conceptual view of an image obtained by two-dimensionally re-encoding image data containing a 2D encoded image.

FIG. 16 is a conceptual view when two-dimensionally encoding the entire document image 5102 containing the 2D encoded image 5103. An image 53001 is generated by scanning with the multi-functional peripheral 5104, and contains a 2D encoded image 53002. When the image 53001 is generated by scanning the document image 5102 at a resolution enough for decoding, the input data 5101 can be restored by decoding the 2D encoded image 53002. Data 53003 are prepared by dividing data of the image 53001. The image 53001 can be restored by concatenating three data 53003. Data 53004 are prepared by adding header information such as the data size, file name, and data number after division to the respective divided data 53003. The header structure will be described with reference to FIG. 17. An image (2D encoded image) 53005 is prepared by two-dimensionally encoding each header-added divided data 53004. For example, when data, which requires a 2D encoded image size corresponding to A4 size upon 2D encoding at 200 dpi, is two-dimensionally encoded into A4 size at 100 dpi, 2D encoded images of four pages at almost A4 size are necessary. In encoding such data at a low resolution, it can be divided as shown in FIG. 16 to generate 2D encoded images at a desired size and resolution.

As for the 2D encoded image shown in FIG. 16, the header-added divided data 53004 can be restored by decoding the respective three 2D encoded images 53005. Even if document sheets containing the respective 2D encoded images 53005 are separately scanned, the attached header allows identifying data corresponding to each scanned 2D encoded image. Hence, the divided data 53003 can be restored from the header-added divided data 53004, and the image 53001 can be finally restored at the same resolution as that in input. In the fifth embodiment, the entire image 53001 is two-dimensionally encoded again. It is also possible to extract the 2D encoded image 53002 from the image 53001, decode only the 2D encoded image 53002, and then two-dimensionally encode it again. In this case, the amount of data to be two-dimensionally encoded again can be reduced.

FIG. 17 is a view showing an example of the header-added divided data 53004 when dividing and two-dimensionally encoding again the image shown in FIG. 16. A header part 54010 has a structure for adding information about data before and after division. This information is not contained in image data before division. A data part 54011 corresponds to each divided data 53003 in FIG. 16. The entire data 53004 made up of the header part 54010 and data part 54011 is two-dimensionally encoded again. The input data 53001 is restored on the basis of the data part 54011 by concatenating divided data after decoding the 2D encoded images 53005. Two-dimensional encoded image information 54001 is about a 2D re-encoded image, and contains the read resolution, data type, and the like necessary to decode 2D encoded data. Original file information 54002 contains file attributes such as the size, access limitation, and file name of a file corresponding to image data before data division. An area 54003 holds the data size of the divided data part 54011 and that of an original file before division. An area 54004 holds information representing the number of divided image data and the page number of image data corresponding to the data part 54011. In decoding, data having this structure can provide information on a 2D encoded image contained in a concatenated original image, the attributes of an image data file before data division, the data size of divided data, and the order of corresponding divided data.

A process to transmit image data generated by reading a document image by the multi-functional peripheral 5104 will be explained with reference to FIG. 18. The process shown in FIG. 18 starts when the user sets a document on the multi-functional peripheral 5104 and instructs the multi-functional peripheral 5104 to transmit image data.

In step S55001, the DISPLAY 5208 displays a document transmission setup window to prompt the user to make document transmission settings. The transmission settings may include the transmission resolution and a setting representing whether to transmit a 2D encoded image-attached document, in addition to the destination and transmission format described in step S1001. In the fifth embodiment, these settings include a setting representing whether to transmit a 2D encoded image-attached document, and transmission of a 2D encoded image-attached document is set.

In step S55002, the user is prompted to designate whether to start transmission. If the user designates the start of transmission, the transmission process in step S55003 and subsequent steps starts. If the user does not designate the start of transmission, the process returns to step S55001 to display the document transmission setup window again and prompt the user to make settings.

In step S55003, it is determined by referring to the contents set in step S55001 whether to perform the transmission process accompanied by resolution conversion. For example, it is determined whether to perform FAX transmission, and the process branches. If transmission accompanied by resolution conversion is to be performed, the resolution need be converted in accordance with the capability of the external apparatus 5105 to transmit image data. If transmission is not accompanied by resolution conversion, the process advances to step S55020. A document is read at the transmission resolution in step S55020, and the image is transmitted in step S55010, completing the process. If transmission is accompanied by resolution conversion, the resolution of a transmission image need be converted in accordance with the destination, as described above. Thus, the process advances to step S55004 and subsequent steps.

In step S55004, the receivable resolution of the external apparatus 5105, e.g., FAX capability information of the external apparatus (destination apparatus) 5105 is acquired. The FAX capability information includes the line speed and receivable resolution, and a FAX transmission process corresponding to the destination capability is executed. The acquired FAX capability information of the external apparatus 5105 is temporarily held, and then the process advances to step S55005.

In step S55005, the transmission resolution set by the user in step S55001 is compared with the receivable resolution of the external apparatus 5105 acquired in step S55004 to decide a transmission resolution. As the transmission resolution, a lower one of the receivable resolution of the external apparatus 5105 and the transmission resolution set by the user in step S55001 is selected. The decided transmission resolution need not always be changed depending on the capability of the external apparatus 5105 acquired in step S55004. It suffices to guarantee that the external apparatus 5105 can receive image data. For example, Group3 FAX communication enables transmitting an image at horizontal×vertical resolutions of 200 dpi×100 dpi in the normal mode and at 200 dpi×200 dpi in the fine mode. Group4 FAX communication enables transmitting an image at 400 dpi×400 dpi in addition to the Group3 resolutions. Hence, in Group3 or Group 4 FAX communication, 200 dpi×100 dpi in the normal mode may be adopted as a fixed transmission resolution.

In step S55006, a document is scanned at high resolution to generate high-resolution document image data. By generating high-resolution document image data, image data from which the 2D encoded image 5103 printed on the input document image 5102 can be decoded can be generated. The generated image data is temporarily held, and the process advances to the next step.

In step S55007, it is determined whether the image data generated in step S55006 contains a 2D encoded image. Whether the image data contains a 2D encoded image is determined in accordance with the designation contents set by the user in step S55001 to represent whether to transmit a 2D encoded image-attached document. As another determination method, the generated image data may undergo a 2D encoded image decoding process. Alternatively, identification information representing whether a 2D encoded image exists may be described in an area different from that of a 2D encoded image in the document image 5102, and the area of the identification information may be analyzed to determine the presence of a 2D encoded image. If it is determined that no 2D encoded image exists, the process advances to step S55010 to transmit image data, completing the process. If it is determined that a 2D encoded image exists, the process advances to step S55008.

In step S55008, in order to generate a 2D encoded image decodable at the transmission resolution decided in step S55005, the image data generated by scanning in step S55006 is two-dimensionally encoded again to generate and hold a 2D encoded image. At this time, when high-resolution image data is converted into a low resolution, the 2D encoded image may become large and extend over one page of a transmission image. The page division process in this case will be described later with reference to FIG. 21. In the fifth embodiment, the entire image data generated in step S55006 is two-dimensionally encoded again. As data to be two-dimensionally encoded again in step S55008, only the area of the 2D encoded image 5103 may be separated as image data, set as the input data 53001, and two-dimensionally encoded again.

In step S55009, the resolution of the image data generated in step S55006 is converted in accordance with the transmission resolution decided in step S55005, and the resolution-converted image is held. A 2D encoded image contained in the resolution-converted image may not be able to be decoded owing to resolution conversion.

In step S55010, the image two-dimensionally encoded again in step S55008 and the image generated in step S55009 are transmitted to the external apparatus 5105 at the destination. Concrete contents of the transmission process are not related to the gist of the present invention, and will not be described. In the fifth embodiment, a 2D re-encoded image and resolution-converted image are transmitted for one document sheet. However, it suffices to transmit an image at a resolution at which 2D encoded image 5103 can be decoded. For example, only the image two-dimensionally encoded again in step S55008 may be transmitted. If the 2D re-encoded image is sufficiently small, it may be composited with the image converted in resolution in step S55009 to transmit one composited image.

By the above-described process, the multi-functional peripheral 5104 transmits image data containing a 2D encoded image to the external apparatus 5105.

Figure 18:
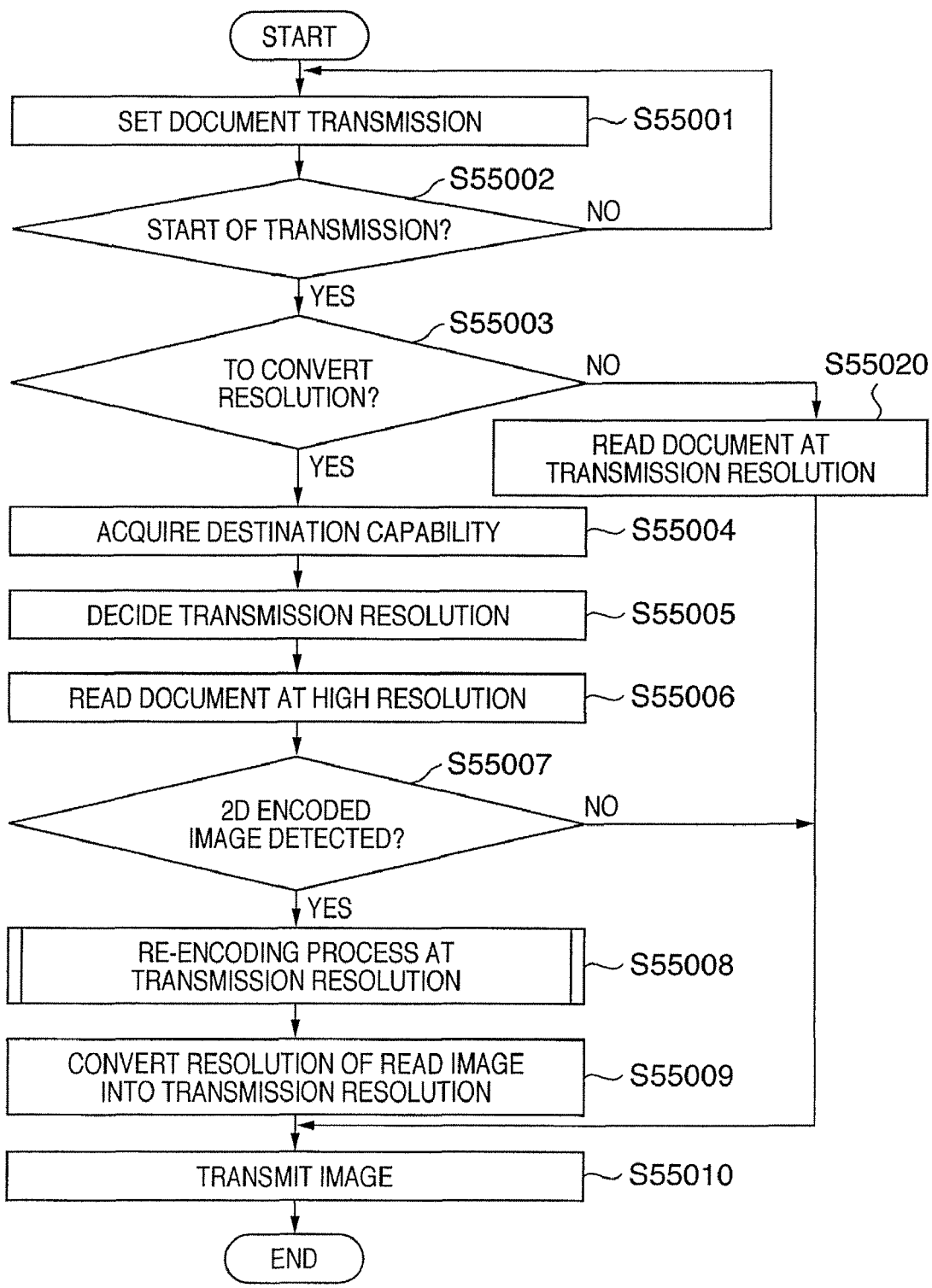
FIG. 18 is a flowchart showing a process for transmitting image data containing a 2D encoded image by an image input/output apparatus.
Figure 19:
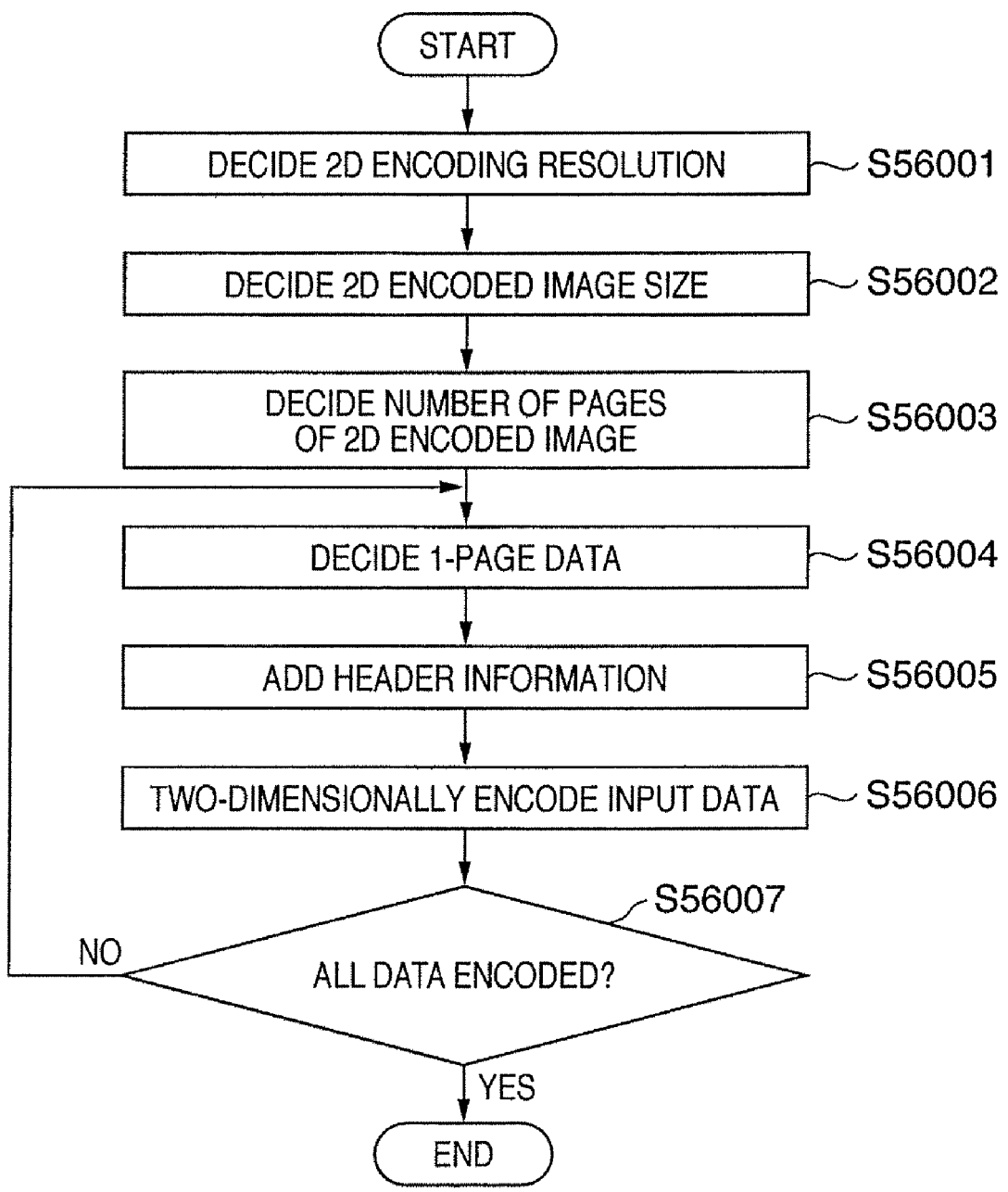
FIG. 19 is a flowchart showing the 2D re-encoding process.

FIG. 19 is a flowchart showing details of the 2D re-encoding process in step S55008 of FIG. 18.

In step S56001, the resolution of a 2D encoded image to be generated is decided. At this time, the resolution is set to one at which a 2D encoded image can be decoded even if transmitted at the transmission resolution decided in step S55005 of FIG. 18. In the fifth embodiment, assuming that the resolution of a decodable 2D encoded image is equal to or lower than the transmission resolution, the resolution of a 2D encoded image to be generated is set equal to the transmission resolution.

In step S56002, the size of a 2D encoded image to be transmitted is decided. Although the upper limit of the size of a 2D encoded image is the size of one page of a transmittable image, the size of a 2D encoded image may be equal to or smaller than the size of one page. In the fifth embodiment, a 2D encoded image to be transmitted has only one size. When generating and transmitting a plurality of 2D encoded images, their image sizes need not be equal to each other.

In step S56003, the number of pages to which a 2D re-encoded image is divided is calculated from the resolution of a 2D re-encoded image to be generated that has been decided in step S56001, the image size of a 2D re-encoded image to be generated that has been decided in step S56002, a data size necessary for the header part 54010 shown in FIG. 17, and the data size of the input data part 54011, thereby determining the number of pages.

In steps S56004 to S56006, 1-page 2D re-encoded images are repetitively generated. In step S56004, the size of divided data is decided from the resolution of a 2D re-encoded image that has been decided in step S56001, the image size of a 2D re-encoded image that has been decided in step S56002, and a data size necessary for the header part 54010. Then, data is divided.

In step S56005, information of the header part 54010 is set. The values of the page number and data size are set in accordance with the divided data. By the processes in steps S56004 and S56005, header-added divided data can be generated as an input to generate a 2D re-encoded image as shown in FIG. 17.

In step S56006, the header-added divided data 53004 generated in step S56005 is two-dimensionally encoded at the resolution decided in step S56001 and the image size decided in step S56002, generating the 2D encoded image 53005 corresponding to the input data. The generated 2D re-encoded image is held, and the processes in steps S56004 to S56006 are repetitively executed until it is determined in step S56007 that all image data have been two-dimensionally encoded. If all image data have been two-dimensionally encoded again in step S56007, the process is complete.

Figure 20:
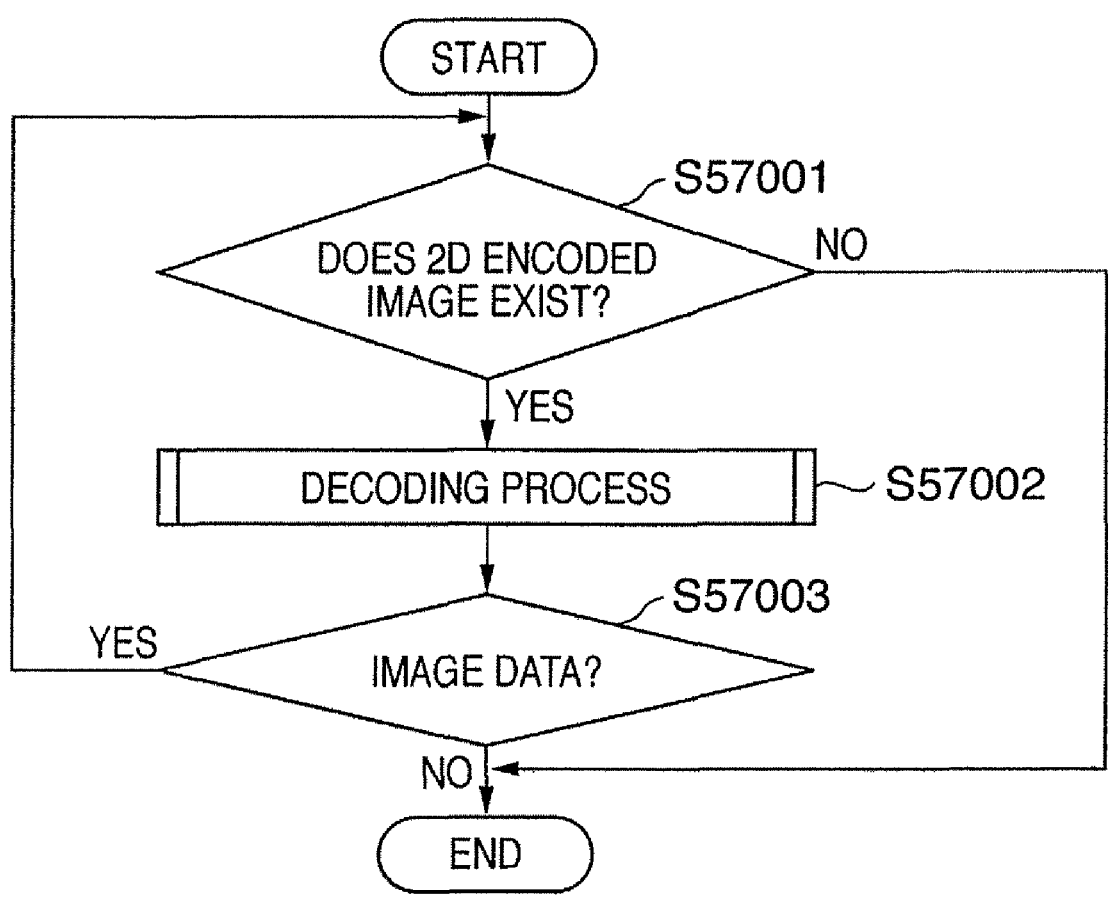
FIG. 20 is a flowchart showing a process for determining whether to perform the decoding process.

The decoding process by the external apparatus 5105 upon receiving an image will be explained with reference to FIG. 20. The process in FIG. 20 starts when the external apparatus 5105 receives an image, the user instructs the external apparatus 5105 to decode a received image, or the user instructs the external apparatus 5105 to read a printout of a received image.

In step S57001, it is determined whether a received or scanned image contains a 2D encoded image. As the determination method, the decoding process may be tried to determine whether it can be executed. The user may set whether a 2D encoded image exists, or determination may be made from a setting representing whether a 2D encoded image exists. If it is determined that no 2D encoded image exists, the process ends; if it is determined that a 2D encoded image exists, the process advances to the decoding process in step S57002. In the decoding process in step S57002, image data is decoded to obtain decoded data.

In step S57003, it is determined whether the decoded data is image data. Whether the decoded data is image data can be determined by checking the file name, file header, or the like. If the decoded data is image data, the image data may further contain a 2D encoded image. Thus, the process returns to step S57001 to determine whether a 2D encoded image further exists, and the process continues. If it is determined in step S57003 that the decoded data is not image data, no decoding process need be executed again, so the process ends. By the above-mentioned process, even upon receiving an image having repetitively undergone the 2D encoding process, the image can be repetitively decoded to restore original data.

Figure 21:
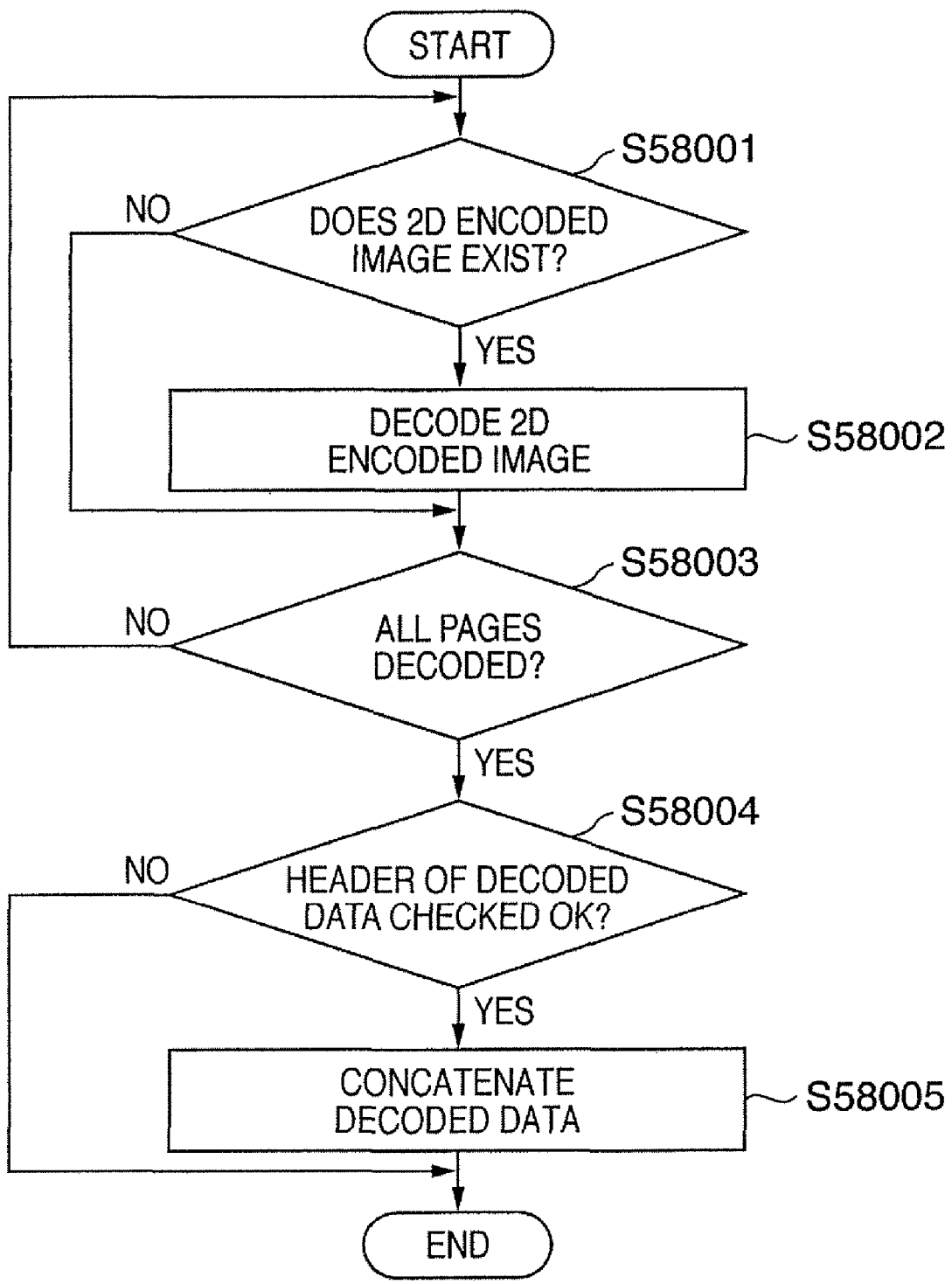
FIG. 21 is a flowchart showing a process for decoding an image containing a 2D encoded image.

FIG. 21 is a flowchart showing the 2D encoded image decoding process in step S57002. Details of the decoding process in step S57002 will be explained with reference to FIG. 21.

In step S58001, it is determined whether a 2D encoded image exists in a 1-page image. The determination method is the same as that in step S57001. If it is determined that a 2D encoded image exists, the process advances to step S58002; if it is determined that no 2D encoded image exists, the process advances to step S58003. In step S58002, the 2D encoded image is decoded, obtaining the encoded header-added divided data 53004. After obtaining the header-added divided data 53004, the process advances to step S58003. In step S58003, it is determined whether all the pages of the image to be decoded have been decoded. If all the pages have been decoded, the process advances to step S58004. If all the pages have not been decoded, the process returns to step S58001 to determine whether a 2D encoded image exists in the next page. Steps S58001 to S58002 are repeated until all pages have been decoded. After that, the process advances to step S58004.

In step S58004, the header parts of decoded data are checked to confirm whether all correct divided data have been obtained. As the confirmation method, the total data size in the area 54003 shown in FIG. 17 is checked, or it is confirmed whether all the number of pages in the area 54004 and all file names have been obtained. If a mismatch occurs as a result of the confirmation such that the data size is not equal to the total data size or the number of pages is smaller than that in the area 54004, the process ends with an error. If the check is normally complete, the process advances to step S58005. In step S58005, divided data are concatenated. In the concatenation process, data are concatenated in order on the basis of page information in the area 54004 to save the concatenated data as a file. By the above-described process, the input data 53001 as an original image can be attained from one or more 2D encoded images 53005 shown in FIG. 16.

Other Embodiments

The object of the present invention is also achieved as follows. More specifically, a recording medium (or storage medium) which records software program codes for implementing the functions of the above-described embodiments is supplied to a system or apparatus. The computer (or the CPU or MPU) of the system or apparatus reads out and executes the program codes stored in the recording medium, implementing the functions (processors) of the above-described embodiments. In this case, the program codes read out from the recording medium are necessary to implement the functions and arrangements of the above-described embodiments. The recording medium which stores the program codes constitutes the present invention. Some processes of the above-described flowcharts may also be implemented by executing programs by a computer, and the remaining processes may be implemented by hardware such as an electronic circuit.

An OS (Operating System) or the like running on the computer may perform some or all of actual processes by executing the readout program codes by the computer. The present invention also includes a case where this process implements the functions of the above-described embodiments.

Further, the program codes read out from the recording medium may be written in the memory of a function expansion card inserted into the computer or the memory of a function expansion unit connected to the computer. Then, the CPU of the function expansion card or function expansion unit may perform some or all of actual processes on the basis of the instructions of the program codes. The present invention also includes a case where this process implements the functions of the above-described embodiments.

When the present invention is applied to the recording medium, the recording medium records program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2006-198213 filed Jul. 20, 2006 and No. 2006-327629 filed Dec. 4, 2006 which are hereby incorporated by reference herein in their entirety.

What is claimed is:

1. An image processing apparatus, comprising:
a restoration unit constructed to, in a case where an instruction for transmitting a document image to an external apparatus is inputted by a user and the document image to be transmitted contains a first barcode image, restore information by decoding the first barcode image contained in the document image;
an encoding unit constructed to encode the restored information to generate a second barcode image at a transmission resolution, the second barcode image being decodable at the transmission resolution at the external apparatus; and
a transmission unit constructed to transmit the second barcode image to the external apparatus.

2. The apparatus according to claim 1, wherein the transmission resolution includes a resolution corresponding to capability of a device at the destination.

3. The apparatus according to claim 1, wherein the transmission resolution includes a resolution designated by a user.

4. The apparatus according to claim 1, wherein the transmission resolution includes a resolution corresponding to capability of a line used for transmission.

5. The apparatus according to claim 1, further comprising a reading unit constructed to read a document with a read resolution, thereby obtaining the document image, wherein the read resolution set for obtaining the document image includes a resolution enough for the restoration unit to decode the first barcode image contained in the document image.

6. The apparatus according to claim 1, further comprising a determination unit constructed to determine whether to convert a resolution of the document image,
wherein when the determination unit determines to convert the resolution of the document image, the restoration unit restores the information by decoding the first barcode image, the encoding unit generates the second barcode image by encoding the restored information, and the transmission unit transmits the generated second barcode image, and
wherein when the determination unit determines not to convert the resolution of the document image, the transmission unit transmits the document image without the second barcode image to the external apparatus.

7. The apparatus according to claim 1, wherein the transmission unit replaces the first barcode image contained in the document image with the second barcode image generated by the encoding unit, and transmits the document image replaced with the second barcode image to the external apparatus.

8. The apparatus according to claim 1, wherein the encoding unit generates the second barcode image divided into a plurality of encoded images.

9. The apparatus according to claim 8, wherein when the information extends over one encoded image, the encoding unit generates the second barcode image divided into a plurality of encoded images.

10. The apparatus according to claim 1, wherein the information includes at least one of a document file, still image file, moving image file, audio file, and execution file.

11. The apparatus according to claim 1, further comprising:
a designation unit constructed to designate a transmission format,
wherein, the transmission unit transmits the restored information without encoding by the encoding unit, as a file attached to e-mail to the external apparatus by e-mail, in a case where the designation unit designates e-mail as the transmission format.

12. The apparatus according to claim 11, wherein the transmission unit transmits, as the file attached to the e-mail to the external apparatus, the information which has been restored by the restoration unit and the document image.

13. The apparatus according to claim 1, wherein the first and second barcode images are 2D encoded images obtained by two-dimensionally encoding.

14. An image processing apparatus, comprising:
a setting unit constructed to set an outputting resolution;
a restoration unit constructed to, in a case where an instruction for outputting a document image to an external apparatus is inputted by a user and the document image to be outputted contains a first barcode image, restore information by decoding the first barcode image contained in the document image;
an encoding unit constructed to encode the restored information to generate a second barcode image at the outputting resolution set by the setting unit, the second barcode image being decodable at the outputting resolution at the external apparatus; and
an output unit constructed to output the second barcode image to the external apparatus.

15. The apparatus according to claim 14, wherein the first and second barcode images are 2D encoded images obtained by two-dimensionally encoding.

16. An image processing method performed by an image processing apparatus having a reading unit constructed to read a document as document image, and a transmission unit constructed to transmit the document image, the method comprising:
a restoration step of, in a case where an instruction for transmitting a document image to an external apparatus is inputted by a user and where the document image to be transmitted, which is read by the reading unit, contains a first barcode image, restoring information by decoding the first barcode image contained in the document image;
an encoding step of encoding the restored information to generate a second barcode image at a transmission resolution to the second barcode image being decodable at the transmission resolution at the external apparatus; and
a transmission control step of controlling the transmission unit to transmit the second barcode image to the external apparatus.

17. The method according to claim 16, further comprising a designation step of designating a transmission format;

wherein the transmission unit is controlled to transmit the restored information without encoding, as a file attached to e-mail to the external apparatus, in a case where e-mail is designated as the transmission format in the designation step.

18. A non-transitory computer-readable storage medium which stores a program for causing a computer to execute the image processing method defined in claim 16.

19. The method according to claim 16, wherein the first and second barcode images are 2D encoded images obtained by two-dimensionally encoding.

20. An image processing method performed by an image processing apparatus having a reading unit constructed to read a document as a document image, and an output unit constructed to output the document image, the method comprising:
- a setting step of setting an outputting resolution;
- a restoration step of, in a case where an instruction for outputting a document image to an external apparatus is inputted by a user and the document image to be outputted read by the reading unit contains a first barcode image, restoring information by decoding the first barcode image contained in the document image;
- an encoding step of encoding the restored information to generate a second barcode image at the outputting resolution set in the setting step, the second barcode image being decodable at the outputting resolution at the external apparatus; and
- an output control step of controlling the output unit to output the second barcode image to the external apparatus.

21. The method according to claim 20, wherein the first and second barcode images are 2D encoded images obtained by two-dimensionally encoding.

22. An image processing apparatus, comprising:
- a reading unit constructed to generate image data by reading a document;
- a transmission resolution determination unit constructed to determine a transmission resolution when transmitting the image data to an external apparatus;
- a determination unit constructed to determine whether the image data contains a 2D encoded image, the 2D encoded image being a barcode image obtained by two-dimensionally encoding an image;
- a 2D re-encoded image resolution determination unit constructed to determine a resolution of a 2D re-encoded image decodable at the transmission resolution determined by the transmission resolution determination unit when the determination unit determines that the image data contains the 2D encoded image;
- a 2D re-encoded image generation unit constructed to two-dimensionally re-encode the image data including the 2D encoded image into a 2D re-encoded image at the resolution determined by the 2D re-encoded image resolution determination unit, 2D re-encoded image being a barcode image obtained by two-dimensionally re-encoding; and
- a transmission unit constructed to transmit the 2D re-encoded image generated by the 2D re-encoded image generation unit to the external apparatus.

23. The apparatus according to claim 22,
Wherein the 2D re-encoded image generation unit comprises
- an image-size determination unit constructed to determine a size of the 2D re-encoded image to be generated;
- a divided-data size determination unit constructed to determine size of each data into which the image data is divided, based on the size of the 2D re-encoded image determined by the image-size determination unit and the resolution determined by the 2D re-encoded image resolution determination unit,
- an image data division unit constructed to divide the image data on the basis of the size determined by the divided-data size determination unit, and
- a header information addition unit constructed to add, to the divided image data, header information for concatenating the divided image data, and
- wherein the 2D re-encoded image generation unit two-dimensionally encodes the divided image data to which the header information addition unit adds the header information, into the 2D re-encoded image at the resolution determined by the 2D re-encoded image resolution determination unit.

24. The apparatus according to claim 22, wherein the transmission resolution determination unit determines the transmission resolution in accordance with a resolution set by a user.

25. The apparatus according to claim 22, further comprising a receivable resolution acquisition unit constructed to acquire a receivable resolution of the external apparatus,
- wherein the transmission resolution determination unit determines the receivable resolution acquired by the receivable resolution acquisition unit as the transmission resolution.

26. An image processing apparatus, comprising:
- a reading unit constructed to generate image data by reading a document;
- a transmission resolution determination unit adapted to determine a transmission resolution when transmitting the image data to an external apparatus;
- a determination unit constructed to determine whether the image data contains a 2D encoded image, the 2D encoded image being a barcode image obtained by two-dimensionally encoding an image;
- a 2D re-encoded image resolution determination unit constructed to determine a resolution of a 2D re-encoded image decodable at the transmission resolution determined by the transmission resolution determination unit when the determination unit determines that the image data contains the 2D encoded image;
- a 2D encoded image acquisition unit constructed to extract the 2D encoded image from the image data;
- a 2D re-encoded image generation unit constructed to two-dimensionally re-encode the 2D encoded image acquired by the 2D encoded image acquisition unit into a 2D re-encoded image at the resolution determined by the 2D re-encoded image resolution determination unit, the 2D re-encoded image being a barcode image obtained by two-dimensionally re-encoding; and
- a transmission unit constructed to transmit the 2D re-encoded image generated by the 2D re-encoded image generation unit to the external apparatus.

27. An image processing method, comprising:
- a reading step of generating image data by reading a document;
- a transmission resolution determination step of determining a transmission resolution when transmitting the image data to an external apparatus;
- a determination step of determining whether the image data contains a 2D encoded image, the 2D encoded image being a barcode image obtained by two-dimensionally encoding an image;
- a 2D re-encoded image resolution determination step of determining a resolution of a 2D re-encoded image decodable at the transmission resolution determined in the transmission resolution determination step when the image data is determined in the determination step to contain the 2D encoded image;

a 2D re-encoded image generation step of two-dimensionally re-encoding the image data including the 2D encoded image into a 2D re-encoded image at the resolution determined in the 2D re-encoded image resolution determination step, the 2D re-encoded image being a barcode image obtained by two-dimensionally re-encoding; and a transmission step of transmitting the 2D re-encoded image generated in the 2D re-encoded image generation step to the external apparatus.

28. A non-transitory computer-readable storage medium which stores a program for causing a computer to execute the image processing method defined in claim 27.

\* \* \* \* \*